United States Patent
Stracca et al.

(10) Patent No.: US 10,135,557 B2
(45) Date of Patent: Nov. 20, 2018

(54) ENCAPSULATION OF DIGITAL COMMUNICATIONS TRAFFIC FOR TRANSMISSION ON AN OPTICAL LINK

(71) Applicant: Telefonaktiebolaget LM Ericsson (publ), Stockholm (SE)

(72) Inventors: Stefano Stracca, Pisa (IT); Fabio Cavaliere, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 15/116,087

(22) PCT Filed: Feb. 3, 2014

(86) PCT No.: PCT/EP2014/052056
§ 371 (c)(1),
(2) Date: Aug. 2, 2016

(87) PCT Pub. No.: WO2015/113643
PCT Pub. Date: Aug. 6, 2015

(65) Prior Publication Data
US 2017/0180071 A1    Jun. 22, 2017

(51) Int. Cl.
*H04J 3/16* (2006.01)
*H04J 3/06* (2006.01)
*H04L 1/00* (2006.01)

(52) U.S. Cl.
CPC .......... *H04J 3/1652* (2013.01); *H04J 3/0688* (2013.01); *H04L 1/0009* (2013.01); *H04L 1/0041* (2013.01); *H04L 1/0071* (2013.01)

(58) Field of Classification Search
CPC ............. H04L 49/3081; H04L 12/5602; H04L 2012/5614; H04L 2012/5636; H04J 3/14; H04J 3/0688; H04J 3/1652
See application file for complete search history.

(56) References Cited

U.S. PATENT DOCUMENTS

| | | | |
|---|---|---|---|
| 8,433,969 B1 | 4/2013 | Wu | |
| 2001/0052056 A1* | 12/2001 | Acton | G06F 15/17381 |
| | | | 711/147 |
| 2007/0116046 A1 | 5/2007 | Liu et al. | |

FOREIGN PATENT DOCUMENTS

| | | |
|---|---|---|
| EP | 1 655 870 | 5/2006 |
| WO | WO 2013/139367 | 9/2013 |

OTHER PUBLICATIONS

Centralized Radio Access Networks Over Wavelength-Division Multiplexing: A Plug-and-Play Implementation; Mobile Backhaul for Small Cells by Filippo Ponzini; IEEE Communications Magazine—Sep. 2013.

(Continued)

*Primary Examiner* — Kabir A Timory
(74) *Attorney, Agent, or Firm* — Baker Botts, LLP

(57) ABSTRACT

A method (10) of encapsulating digital communications traffic for transmission on an optical link, the method comprising: a. receiving an input digital communications signal having an input line code (12); b. performing clock and data recovery on the input digital communications signal to obtain input line coded digital communications traffic and a recovered clock signal (14); c. decoding the input digital communications traffic to obtain information bits and non-information bits (16); d. removing the non-information bits (18); e. adding service channel bits for monitoring or maintenance (20); f. assembling the service channel bits and information bits into frames (22); and g. line coding the assembled frames using an output line code to form an encapsulated digital communications signal for transmission on an optical link (24), wherein steps c. to g. are performed using the timing of the recovered clock signal. A communications network receiver configured to implement the method is also provided.

23 Claims, 24 Drawing Sheets

(56) References Cited

OTHER PUBLICATIONS

CPRI Specification v5.0; Interface Specification; Common Public Radio Interlace (CPRI); Interface Specification (this reference has been broken into two parts due to size)—Sep. 21, 2011.
Forward Error Correction Trade-Offs in Reduced-Latency Optical Fiber Transmission Systems by Brian Teipen et al.; ECOC Technical Digest—2012.
CPRI Specification v6.0; Common Public Radio Interface (CPRI); Interface Specification—Aug. 30, 2013.
International Search Report for International application No. PCT/EP2014/052056—dated Oct. 1, 2014.
Optical Transport Network (OTN) Tutorial; Contact: Timothy P. Walker; AMCC—Sep. 20, 2015.
Series G: Transmission Systems and Media, Digital Systems and Networks; Digital terminal equipments—General Series Y: Global Information Infrastructure, Internet Protocol Aspects and Next-Generation Networks; Interfaces for the optical transport network; ITU-T Telecommunication Standardization Sector of ITU; G-709/Y.1331 (due to size, this reference has been split into 10 parts)—Feb. 2012.
Continuously-Interleaved BCH (CI-BCH) FEC delivers best in class NECG for 40G and 100G metro applications by Michael Scholten et al.; NTuB3.pdf; OSA/OFC/NFOEC—2010.

* cited by examiner

ENCAPSULATION OF DIGITAL COMMUNICATIONS TRAFFIC FOR TRANSMISSION ON AN OPTICAL LINK

PRIORITY

This nonprovisional application is a U.S. National Stage Filing under 35 U.S.C. § 371 of International Patent Application Serial No. PCT/EP2014/052056, filed Feb. 3, 2014, and entitled "Encapsulation of Digital Communications Traffic For Transmission on an Optical Link".

TECHNICAL FIELD

The invention relates to a method of encapsulating digital communications traffic for transmission on an optical link and to a communications network transmitter. The invention further relates to a method of converting encapsulated digital communications traffic for transmission on a digital communications link and to a communications network receiver. The invention further relates to a communications network base station node and to a communications network base station.

BACKGROUND

Common Public Radio Interface CPRI transport over optical networks is gaining interest among operators that see it as an opportunity for real estate consolidation and leaned fibre cost saving and, in a longer term perspective, for the realization of an unified transport network spanning from radio front-haul to aggregation and backhaul of fixed and mobile access networks.

The transport technology for the optical transport network, OTN, has been standardized in ITU-T Recommendation G.709 and offers several advantages with respect to the previous generation of SONET/SDH networks, including stronger forward error correction, FEC, multiple levels of tandem connection monitoring, TCM, to communicate and manage error events across multiple domains, transparent transport of different client signals, including Ethernet, SDH, Fibre Channel, FICON, etc., and enhanced switching capability. At present, OTN is by far the most used technique to map any kind of client signal into an optical channel so that at a first glance it seems the natural choice also for CPRI.

OTN mapping of CPRI clients has been proposed and is included at Appendix VIII of G.709/Y.1331 (02.2012) but the standardization work is not yet complete due to three critical technical issues arising from demanding CPRI specifications, namely: jitter, absolute propagation delay and link symmetry. The CPRI jitter specification is 2 ppb r.m.s. phase noise, while current OTN practice is 300 Hz (equivalent to approximately 6 ppb r.m.s. phase noise). The mismatch in phase noise specification could be solved either by modifying the radio equipment to accept higher input noise, significantly increasing its cost, or by modifying the OTN standard to work at a lower phase noise specification, which could be achieved by introducing highly accurate oscillators and filters. Both of these proposed solutions options are business critical, due to the presence of an existing large installed network. Depending on the implementation, CPRI is expected to tolerate about 100 µs absolute propagation delay, which corresponds to 20 km fibre distance. OTN tributaries, e.g. Ethernet, usually do not have strict latency requirements, so OTN nodes and networks do not normally meet the tight latency specification that CPRI requires. Finally, downstream/upstream, DS/US, delay asymmetries introduced by optical link and buffering mechanisms in OTN processors are scarcely tolerated by CPRI, which requires a dedicated compensation mechanism or special optical design, such as bidirectional propagation on a single fibre, to cope.

SUMMARY

It is an object to provide an improved method of encapsulating digital communications traffic for transmission on an optical link. It is a further object to provide an improved communications network transmitter. It is a further object to provide an improved method of converting encapsulated digital communications traffic for transmission on a digital communications link. It is a further object to provide an improved communications network receiver. It is a further object to provide an improved communications network base station node. It is a further object to provide an improved communications network base station.

A first aspect of the invention provides a method of encapsulating digital communications traffic for transmission on an optical link. The method comprises step a. of receiving an input digital communications signal having an input line code. The method comprises step b. of performing clock and data recovery on the input digital communications signal to obtain input line coded digital communications traffic and a recovered clock signal. The method comprises step c. of decoding the input digital communications traffic to obtain information bits and non-information bits, and step d. of removing the non-information bits. The method comprises step e. of adding service channel bits for monitoring or maintenance, and step f. of assembling the service channel bits and information bits into frames. The method comprises step g. of line coding the assembled frames using an output line code to form an encapsulated digital communications signal for transmission on an optical link. Steps c. to g. are performed using the timing of the recovered clock signal.

Removing the non-information bits from the input digital communications signal makes capacity available to add the service channel bits, so a service channel for monitoring or maintenance may be added to the input signal. The method may enable a 'light optical transport layer' to be added to digital communications traffic client signals without one or more of the disadvantages of standard OTN framing. Using the timing of the recovered clock signal for steps c. to g. may enable an input digital communications signal to be transmitted into an optical line with no synchronization accuracy degradation from input to line.

In an embodiment, the input line code has a first spectral efficiency and the output line code has a second spectral efficiency, higher than the first spectral efficiency. Changing the line code that is used to one with a higher spectral efficiency may make room to add the service channel bits. This may enable an in band OAM channel to be added to the input signal.

In an embodiment, the method further comprises obtaining a delay asymmetry of the optical link. Step f. comprises buffering the information bits for a time offset substantially equal to the delay asymmetry. This may enable DS/US delay asymmetry to be compensated for, which may enable the method to meet tight requirements for time division duplex, TDD, and multiple-input-multiple-output, MIMO, in the CPRI Specification.

In an embodiment, step f. further comprises buffering the service channel bits for a time offset substantially equal to the delay asymmetry. This may enable additional compensation for DS/US delay asymmetry to be achieved.

In an embodiment, the delay asymmetry is obtained by estimation depending on at least one parameter of the optical link. Estimating the delay asymmetry based on the design of the optical link may enable the buffer to be configured during installation.

In an embodiment, the delay asymmetry is obtained by measurement. The method of measuring delay asymmetry disclosed in WO2013/139367 may be used. This may enable real time delay asymmetry to be obtained, for the real optical link parameters existing at the time.

In an embodiment, step f. comprises applying forward error correction to the information bits and to the service channel bits using a plurality of interleaved forward error correction codecs each configured to apply a preselected forward error correction code. The method comprises obtaining a maximum acceptable latency to be added by the forward error correction. Said plurality of forward error correction codecs is selected such that a latency added by the forward error correction is not greater than the maximum acceptable latency. Removing the non-information bits from the input digital communications signal makes capacity available to apply forward error correction, FEC, before transmission on the optical link. Control of latency and FEC code-word length may be achieved by selecting the number of FEC codecs used. Latency and FEC code-word length may therefore be reduced as compared to that available for standard OTN framing; G.709 Annex A specifies 16 interleaved codecs. Low latency forward error correction, for example a latency of <4 μs for traffic having a bit rate of 10 Gbit/s, may be provided by adjusting the number of interleaved FEC codecs.

In an embodiment, step f. comprises applying forward error correction to the information bits using a plurality of interleaved forward error correction codecs each configured to apply a first forward error correction code. Step f. also comprises applying forward error correction to the service channel bits using a plurality of interleaved forward error correction codecs each configured to apply a second forward error correction code, different to the first forward error correction code. Using different FEC codes for the information bits and the service channel bits may enable flexibility in handling a service channel which not have the same FEC requirements as the information bits of the digital communications traffic.

In an embodiment, a first plurality of interleaved forward error correction codecs are used to apply forward error correction to the information bits and a second plurality, different to the first plurality, of interleaved forward error correction codecs are used to apply forward error correction to the service channel bits. Using a different number of FEC codecs for the information bits and the service channel bits may enable flexibility in handling a service channel which not have the same latency constraints as the information bits of the digital communications traffic.

In an embodiment, each forward error correction codec is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, step a. comprises receiving a plurality of input digital communications signals each having the input line code. Steps b. to g. are performed for each input digital communication signal to form a respective encapsulated digital communications signal, and a respective optical signal carrying each encapsulated digital communications signal is generated and transmitted. The method comprises further step i. of receiving each said optical signal and further step ii. of performing clock and data recovery on each respective encapsulated digital communications signal to obtain the respective frames and a respective recovered clock signal. The method comprises further step iii. of obtaining a clock signal from at least one of the recovered clock signals. The method comprises further step iv. of disassembling the frames of each said signal and removing the forward error correction coding to obtain the respective service channel bits and information bits. The respective service channel bits are then removed from each said signal. The method comprises further step v. of time division multiplexing the information bits from each of the said signals and further step vi. of adding further service channel bits for monitoring or maintenance. The method comprises further step vii. of applying forward error correction to the further service channel bits and time division multiplexed information bits and assembling the further service channel bits and time division multiplexed information bits into frames. The method comprises further step viii. of line coding the assembled frames using the output line code to form an encapsulated aggregate digital communications signal for transmission on an optical link. Further steps v. to viii. are performed using the timing of the clock signal obtained in further step iii.

The method also enables multiplexing of FEC protected tributary optical signals into one higher bit rate signal. The multiplexing function is time division based, on the assumption that all links are frequency synchronous, therefore no phase synchronization is required.

In an embodiment, the clock signal is obtained by one of arbitrarily selecting one of the recovered clock signals, selecting a most accurate one of the recovered clock signals and averaging the recovered clock signals. Assuming that all of the input digital communications signals are frequency synchronous enables an arbitrary one of the recovered clock signals to be selected as the clock signal. Where there is some variation in the recovered clock signals the method may enable an appropriate clock signal to be obtained for further method steps v. to viii.

In an embodiment, step a. comprises receiving a plurality of time division multiplexed input digital communications signals and each said signal is independently forward error correction coded in step. f. This may enable the input digital communications signals to be terminated at different points along the optical link. Time-multiplexing can be performed either on the input digital communications signals or on the FEC wrapped signals to enable independent signal termination at different points.

In an embodiment, each input digital communications signal is a common public radio interface, CPRI, signal as defined in the CPRI Specification. The method may enable robust optical transport of CPRI signals over geographical distances overcoming jitter, latency and delay asymmetry issues associated with standard OTN solutions based on ITU-T G.709. The method may be used to add a light optical transport layer to CPRI client signals without the disadvantages of standard OTN framing. Encapsulating digital communications traffic in this way may enable fulfilment of CPRI jitter requirements, latency control, robustness of error correction, being able to guarantee a bit error rate, BER, o<$10^{-12}$ in challenging scenarios, and compatibility with multiple technologies, for example coarse wavelength division multiplexing, CWDM, and dense wavelength division multiplexing, DWDM, and multiple network topologies, including point to point, ring, and mesh.

In an embodiment, the input line code is one of 8B10B and 64B66B and the output line code is 64B66B. The CPRI line rate may be preserved by substituting 8B10B coding with a more efficient line coding in order to make room for FEC and an in-band OAM channel. In an embodiment, the service channel bits are for an operation, administration and maintenance, OAM, channel.

In an embodiment, further step vii. comprises applying a Reed-Solomon forward error correction code. In an embodiment, further step vii. comprises applying a Reed-Solomon (255, 239) code.

A second aspect of the invention provides a communications network transmitter comprising an input, clock and data recovery apparatus, decoder apparatus, a framer, line coding apparatus and an optical transmitter. The input is arranged to receive an input digital communications signal having an input line code. The clock and data recovery apparatus is arranged to perform clock and data recovery on the input digital communications signal to obtain input line coded digital communications traffic and a recovered clock signal. The clock and data recovery apparatus is arranged to generate and transmit a clock signal comprising the recovered clock signal. The decoder apparatus is arranged to decode the input digital communications traffic to obtain information bits and non-information bits, and to remove the non-information bits. The framer is arranged to receive the information bits and service channel bits for monitoring or maintenance, and to assemble the service channel bits and information bits into frames. The line coding apparatus is arranged to line code the assembled frames using an output line code to form an encapsulated digital communications signal for transmission on an optical link. The optical transmitter is arranged to generate and transmit an optical signal carrying the encapsulated digital communications signal. Each of the decoder apparatus, the framer and the line coding apparatus are arranged to receive the clock signal and are arranged to operate using the timing of the recovered clock signal.

By removing the non-information bits from the input digital communications signal the communications network transmitter makes capacity available to add the service channel bits, which may enable it to add a service channel for monitoring or maintenance to the input signal. The communications network transmitter may enable a 'light optical transport layer' to be added to digital communications traffic client signals without one or more of the disadvantages of standard OTN framing. Using the timing of the recovered clock signal for steps c. to g. may enable communications network transmitter to transmit an input digital communications signal into an optical line with no synchronization accuracy degradation from input to line.

In an embodiment, the input line code has a first spectral efficiency and the line coding apparatus is arranged to line code the assembled frames using an output line code having a second spectral efficiency, higher than the first spectral efficiency. Changing the line code that is used to one with a higher spectral efficiency may make room to add the service channel bits. This may enable an in band OAM channel to be added to the input signal.

In an embodiment, the framer is arranged to obtain a delay asymmetry of the optical link. The framer comprises a buffer arranged to buffer the information bits for a time offset substantially equal to the delay asymmetry. This may enable DS/US delay asymmetry to be compensated for, which may enable the communications network transmitter to meet tight requirements for time division duplex, TDD, and multiple-input-multiple-output, MIMO, in the CPRI Specification.

In an embodiment, the framer also comprises a buffer arranged to buffer the service channel bits for a time offset substantially equal to the delay asymmetry. This may enable additional compensation for DS/US delay asymmetry to be achieved.

In an embodiment, each buffer is arranged to buffer the respective bits for an estimated delay asymmetry. The delay asymmetry is obtained by estimation depending on at least one parameter of the optical link. Estimating the delay asymmetry based on the design of the optical link may enable the buffer to be configured during installation.

In an embodiment, each buffer is arranged to buffer the respective bits for a delay asymmetry obtained by measurement. The method of measuring delay asymmetry disclosed in WO2013/139367 may be used. This may enable each buffer to be configured with a real time delay asymmetry, for the real optical link parameters existing at the time.

In an embodiment, the framer comprises forward error correction apparatus comprising a plurality of forward error correction codecs. Each forward error correction codec is configured to apply a preselected forward error correction code. The forward error correction codecs are interleaved and said plurality of interleaved forward error correction codecs is such that a latency added by the forward error correction is not greater than a maximum acceptable latency. Removing the non-information bits from the input digital communications signal makes capacity available to apply forward error correction, FEC, before transmission on the optical link. Control of latency and FEC code-word length may be achieved by selecting the number of FEC codecs used. Latency and FEC code-word length may therefore be reduced as compared to that available for standard OTN framing; G.709 Annex A specifies 16 interleaved codecs. Low latency forward error correction, for example a latency of <4 μs for traffic having a bit rate of 10 Gbit/s, may be provided by adjusting the number of interleaved FEC codecs.

In an embodiment, the forward error correction apparatus comprises a plurality of interleaved forward error correction codecs each configured to apply a first forward error correction code to the information bits and the forward error correction apparatus comprises a plurality of interleaved forward error correction codecs each configured to apply a second forward error correction code to the service channel bits. The second forward error correction code is different to the first forward error correction code. Using different FEC codes for the information bits and the service channel bits may enable flexibility in handling a service channel which not have the same FEC requirements as the information bits of the digital communications traffic.

In an embodiment, the forward error correction apparatus comprises a first plurality of interleaved forward error correction codecs configured to apply forward error correction to the information bits and a second plurality, different to the first plurality, of interleaved forward error correction codecs configured to apply forward error correction to the service channel bits. Using a different number of FEC codecs for the information bits and the service channel bits may enable flexibility in handling a service channel which not have the same latency constraints as the information bits of the digital communications traffic.

In an embodiment, each forward error correction codec is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, the communications network transmitter further comprises at least one further input, clock and data recovery apparatus, decoder apparatus, framer and line coding apparatus as described above, a plurality of optical receivers, a plurality of further clock and data recovery apparatus, a clock selector, a plurality of deframers, a time division multiplexer, a further framer, further line coding apparatus and a further optical transmitter. Each of the optical receivers is arranged to receive a respective optical signal from a respective one of the transmitters carrying a respective encapsulated digital communications signal. Each of the further clock and data recovery apparatus is arranged to perform clock and data recovery on the respective encapsulated digital communications signal to obtain the respective frames and a respective recovered clock signal. The clock selector is arranged to obtain a clock signal from at least one of the recovered clock signals and to generate and transmit a further clock signal comprising said obtained clock signal. Each of the deframers is arranged to disassemble the frames of the respective decoded digital communications signal and remove the forward error correction coding to obtain the respective service channel bits and information bits. Each of the deframers is also arranged to remove the respective service channel bits of the respective said signal. The time division multiplexer is arranged to time division multiplex the information bits from each of the said signals. The further framer is arranged to add further service channel bits for monitoring or maintenance, apply forward error correction and assemble the further service channel bits and time division multiplexed information bits into frames. The further line coding apparatus is arranged to line code the assembled frames using the output line code to form an encapsulated aggregate digital communications signal for transmission on an optical link. The further optical transmitter arranged to generate and transmit a further optical signal carrying the encapsulated aggregate digital communications signal. Each of the deframers, the multiplexer, the further framer and the further line coding apparatus are arranged to receive the further clock signal and are arranged to operate using the timing of said obtained clock signal.

The communications network transmitter also enables multiplexing of a plurality of FEC protected tributary optical signals into one higher bit rate signal. The multiplexing function is time division based, on the assumption that all the input digital communications signals are frequency synchronous, therefore no phase synchronization is required. Each deframer terminates FEC and removes service channel bits from the tributary optical signals, while the further framer introduces FEC encoding for the aggregate signal.

In an embodiment, the clock selector is arranged to obtain the clock signal by one of arbitrarily selecting one of the recovered clock signals, selecting a most accurate one of the recovered clock signals and averaging the recovered clock signals. Assuming that all of the input digital communications signals are frequency synchronous enables the clock selector to select an arbitrary one of the recovered clock signals as the clock signal. Where there is some variation in the recovered clock signals the clock selector may be configured to allow an appropriate clock signal to be obtained and distributed.

In an embodiment, each line coding apparatus is a scrambler. A scrambler as defined in section 11.2 of ITU-T Recommendation G.709 may be used.

In an embodiment, each input digital communications signal is a common public radio interface, CPRI, signal as defined in the CPRI Specification. The communications network transmitter may enable robust optical transport of CPRI signals over geographical distances overcoming jitter, latency and delay asymmetry issues associated with standard OTN solutions based on ITU-T G.709. The communications network transmitter may be used to add a light optical transport layer to CPRI client signals without the disadvantages of standard OTN framing. Encapsulating digital communications traffic in this way may enable fulfilment of CPRI jitter requirements, latency control, robustness of error correction, being able to guarantee a bit error rate, BER, o$<10^{-12}$ in challenging scenarios, and compatibility with multiple technologies, for example coarse wavelength division multiplexing, CWDM, and dense wavelength division multiplexing, DWDM, and multiple network topologies, including point to point, ring, and mesh.

In an embodiment, the input line code is one of 8B10B and 64B66B and the output line code is 64B66B. The CPRI line rate may be preserved by substituting 8B10B coding with a more efficient line coding in order to make room for FEC and an in-band OAM channel. In an embodiment, the service channel bits are for an operation, administration and maintenance, OAM, channel.

In an embodiment, the further framer is arranged to apply a Reed-Solomon forward error correction code. In an embodiment, the further framer is arranged to apply a Reed-Solomon (255, 239) code.

A third aspect of the invention provides a method of converting encapsulated digital communications traffic for transmission on a digital communications link. The method comprises step A. of receiving an encapsulated digital communications signal having an input line code from an optical link. The method comprises step B. of performing clock and data recovery on the encapsulated digital communications signal to obtain digital communications traffic frames and a recovered clock signal. The method comprises step C. of disassembling the digital communications traffic frames to obtain information bits and service channel bits for monitoring or maintenance, and step D. of removing the service channel bits. The method comprises step E. of line coding the information bits using an output line code to form an output digital communications signal for transmission on digital communications link. Steps C. to E. are performed using the timing of the recovered clock signal.

Removing the service channel bits may enable non-information bits to be added, to facilitate conversion to an output line code suitable for transmission on a digital communications link. Using the timing of the recovered clock signal for steps C. to E. may enable an encapsulated digital communications signal received from an optical link to be transmitted into digital communications link with no synchronization accuracy degradation from input to digital link.

In an embodiment, the input line code has a first spectral efficiency and the output line code has a second spectral efficiency, lower than the first spectral efficiency. Changing the line code that is used to one with a lower spectral efficiency may enable the service channel bits to be removed. This may enable an in band OAM channel to be.

In an embodiment, the method further comprises obtaining a delay asymmetry of the optical link. Step C. comprises buffering the information bits for a time offset substantially equal to the delay asymmetry. This may enable DS/US delay asymmetry to be compensated for, which may enable the method to meet tight requirements for time division duplex, TDD, and multiple-input-multiple-output, MIMO, in the CPRI Specification.

In an embodiment, the delay asymmetry is obtained by estimation depending on at least one parameter of the optical link. Estimating the delay asymmetry based on the design of the optical link may enable the buffer to be configured during installation.

In an embodiment, the delay asymmetry is obtained by measurement. The method of measuring delay asymmetry disclosed in WO2013/139367 may be used. This may enable real time delay asymmetry to be obtained, for the real optical link parameters existing at the time.

In an embodiment, step C. comprises performing forward error correction on the information bits and the service channel bits using a plurality of interleaved forward error correction codecs each configured to perform a preselected forward error correction code. The method comprises obtaining a maximum acceptable latency to be added by the forward error correction and using a plurality of forward error correction codecs such that a latency added by the forward error correction is not greater than the maximum acceptable latency.

In an embodiment, step C. comprises performing forward error correction on the information bits using a plurality of interleaved forward error correction codecs each configured to perform a first forward error correction code. Step C. also comprises performing forward error correction on the service channel bits using a plurality of interleaved forward error correction codecs each configured to perform a second forward error correction code, different to the first forward error correction code.

In an embodiment, step D. further comprises time division demultiplexing the information bits. Step E. comprises line coding the demultiplexed information bits using the output line code to form a plurality of output digital communications signals for transmission on a plurality of digital communications links.

A fourth aspect of the invention provides a communications network receiver comprising an input, clock and data recovery apparatus, a deframer, line coding apparatus and a digital transmitter. The input is arranged to receive an optical signal carrying an encapsulated digital communications signal having an input line code. The clock and data recovery apparatus is arranged to perform clock and data recovery on the encapsulated digital communications signal to obtain digital communications traffic frames and a recovered clock signal. The clock and data recovery apparatus is arranged to generate and transmit a clock signal comprising the recovered clock signal. The deframer is arranged to disassemble the digital communications traffic frames to obtain information bits and service channel bits for monitoring or maintenance, and is arranged to remove the service channel bits. The line coding apparatus is arranged to line code the information bits using an output line code to form an output digital communications signal for transmission on a digital communications link. The digital transmitter is arranged to generate and transmit the output digital communications signal. The deframer, the line coding apparatus and the digital transmitter are each arranged to receive the clock signal and are each arranged to operate using the timing of the recovered clock signal.

Removing the service channel bits may enable non-information bits to be added, to facilitate conversion to an output line code suitable for transmission on a digital communications link. Using the timing of the recovered clock signal for the deframer, the coding apparatus and the digital transmitter may enable an encapsulated digital communications signal received from an optical link to be transmitted into digital communications link with no synchronization accuracy degradation from input to digital link.

In an embodiment, the input line code has a first spectral efficiency and the coding apparatus is arranged to line code the information bits using an output line code having a second spectral efficiency, lower than the first spectral efficiency. Changing the line code that is used to one with a lower spectral efficiency may enable the service channel bits to be removed. This may enable an in band OAM channel to be removed.

In an embodiment, the deframer is arranged to obtain a delay asymmetry of the optical link. The deframer comprises a buffer arranged to buffer the information bits for a time offset substantially equal to the delay asymmetry. This may enable DS/US delay asymmetry to be compensated for, which may enable the communications network transmitter to meet tight requirements for time division duplex, TDD, and multiple-input-multiple-output, MIMO, in the CPRI Specification.

In an embodiment, the buffer is arranged to buffer the information bits for an estimated delay asymmetry. The delay asymmetry is obtained by estimation depending on at least one parameter of the optical link. Estimating the delay asymmetry based on the design of the optical link may enable the buffer to be configured during installation.

In an embodiment, the buffer is arranged to buffer the information bits for a delay asymmetry obtained by measurement. The method of measuring delay asymmetry disclosed in WO2013/139367 may be used. This may enable each buffer to be configured with a real time delay asymmetry, for the real optical link parameters existing at the time.

In an embodiment, the deframer comprises forward error correction apparatus comprising a plurality of forward error correction codecs each configured to perform a preselected forward error correction code. The forward error correction codecs are interleaved and said plurality of forward error correction codecs is such that a latency added by the forward error correction is not greater than a maximum acceptable latency. Control of latency may be achieved by selecting the number of FEC codecs used. Latency may therefore be reduced as compared to that available for standard OTN framing; G.709 Annex A specifies 16 interleaved codecs. Low latency forward error correction, for example a latency of <4 µs for traffic having a bit rate of 10 Gbit/s, may be provided by adjusting the number of interleaved FEC codecs.

In an embodiment, the deframer comprises forward error correction apparatus comprising a plurality of interleaved forward error correction codecs each configured to perform forward error correction using a first forward error correction code on the information bits and the forward error correction apparatus comprises a plurality of interleaved forward error correction codecs each configured to perform forward error correction using a second forward error correction code on the service channel bits. The second forward error correction code is different to the first forward error correction code. Using different FEC codes for the information bits and the service channel bits may enable flexibility in handling a service channel which not have the same FEC requirements as the information bits of the digital communications traffic.

In an embodiment, each forward error correction codec of the deframer is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, the communications network receiver further comprises a time division demultiplexer, a plurality of framers, at least one further line coding apparatus and at least one further digital transmitter. The time division demultiplexer is arranged to receive the information bits from the deframer and is arranged to time division demultiplex the information bits. Each of the framers is arranged to receive respective information bits from the time division multiplexer and is arranged to assemble the information bits into frames. Each line coding apparatus is arranged to line code the respective framed information bits using the output line code to form a respective output digital communications signal for transmission on a digital communications link. Each digital transmitter is arranged to generate and transmit the respective output digital communications signal. The time division multiplexer, the framers, the at least one further coding apparatus and the at least one further digital transmitter are each arranged to receive the clock signal and are each arranged to operate using the timing of the recovered clock signal.

A fifth aspect of the invention provides a communications network base station node comprising at least one of a communications network transmitter and a communications network receiver. The communications network transmitter comprises an input, clock and data recovery apparatus, decoder apparatus, a framer, line coding apparatus and an optical transmitter. The input is arranged to receive an input digital communications signal having an input line code. The clock and data recovery apparatus is arranged to perform clock and data recovery on the input digital communications signal to obtain input line coded digital communications traffic and a recovered clock signal. The clock and data recovery apparatus is arranged to generate and transmit a clock signal comprising the recovered clock signal. The decoder apparatus is arranged to decode the input digital communications traffic to obtain information bits and non-information bits, and to remove the non-information bits. The framer is arranged to receive the information bits and service channel bits for monitoring or maintenance, and to assemble the service channel bits and information bits into frames. The line coding apparatus is arranged to line code the assembled frames using an output line code to form an encapsulated digital communications signal for transmission on an optical link. The optical transmitter is arranged to generate and transmit an optical signal carrying the encapsulated digital communications signal. Each of the decoder apparatus, the framer and the line coding apparatus are arranged to receive the clock signal and are arranged to operate using the timing of the recovered clock signal. The communications network receiver comprises an input, clock and data recovery apparatus, a deframer, coding apparatus and a digital transmitter. The input is arranged to receive an optical signal carrying an encapsulated digital communications signal having an input line code. The clock and data recovery apparatus is arranged to perform clock and data recovery on the encapsulated digital communications signal to obtain digital communications traffic frames and a recovered clock signal. The clock and data recovery apparatus is arranged to generate and transmit a clock signal comprising the recovered clock signal. The deframer is arranged to disassemble the digital communications traffic frames to obtain information bits and service channel bits for monitoring or maintenance, and is arranged to remove the service channel bits. The coding apparatus is arranged to line code the information bits using an output line code to form an output digital communications signal for transmission on a digital communications link. The digital transmitter is arranged to generate and transmit the output digital communications signal. The deframer, the coding apparatus and the digital transmitter are each arranged to receive the clock signal and are each arranged to operate using the timing of the recovered clock signal.

By removing the non-information bits from the input digital communications signal the communications network transmitter makes capacity available to add the service channel bits, which may enable it to add a service channel for monitoring or maintenance to the input signal. The communications network transmitter may enable a 'light optical transport layer' to be added to digital communications traffic client signals without one or more of the disadvantages of standard OTN framing. Using the timing of the recovered clock signal for steps c. to g. may enable communications network transmitter to transmit an input digital communications signal into an optical line with no synchronization accuracy degradation from input to line. Removing the service channel bits at the receiver may enable non-information bits to be added, to facilitate conversion to an output line code suitable for transmission on a digital communications link. Using the timing of the recovered clock signal for the deframer, the coding apparatus and the digital transmitter may enable an encapsulated digital communications signal received from an optical link to be transmitted into digital communications link with no synchronization accuracy degradation from input to digital link.

In an embodiment, the input line code received at the communications network transmitter has a first spectral efficiency and the line coding apparatus is arranged to line code the assembled frames using an output line code having a second spectral efficiency, higher than the first spectral efficiency. Changing the line code that is used to one with a higher spectral efficiency may make room to add the service channel bits. This may enable an in band OAM channel to be added to the input signal.

In an embodiment, the framer is arranged to obtain a delay asymmetry of the optical link. The framer comprises a buffer arranged to buffer the information bits for a time offset substantially equal to the delay asymmetry. This may enable DS/US delay asymmetry to be compensated for, which may enable the communications network transmitter to meet tight requirements for time division duplex, TDD, and multiple-input-multiple-output, MIMO, in the CPRI Specification.

In an embodiment, the framer also comprises a buffer arranged to buffer the service channel bits for a time offset substantially equal to the delay asymmetry. This may enable additional compensation for DS/US delay asymmetry to be achieved.

In an embodiment, each buffer is arranged to buffer the respective bits for an estimated delay asymmetry. The delay asymmetry is obtained by estimation depending on at least one parameter of the optical link. Estimating the delay asymmetry based on the design of the optical link may enable the buffer to be configured during installation.

In an embodiment, each buffer is arranged to buffer the respective bits for a delay asymmetry obtained by measurement. The method of measuring delay asymmetry disclosed in WO2013/139367 may be used. This may enable each buffer to be configured with a real time delay asymmetry, for the real optical link parameters existing at the time.

In an embodiment, the framer comprises forward error correction apparatus comprising a plurality of forward error correction codecs. Each forward error correction codec is configured to apply a preselected forward error correction code. The forward error correction codecs are interleaved and said plurality of interleaved forward error correction codecs is such that a latency added by the forward error correction is not greater than a maximum acceptable latency. Removing the non-information bits from the input digital communications signal makes capacity available to apply forward error correction, FEC, before transmission on the optical link. Control of latency and FEC code-word length may be achieved by selecting the number of FEC codecs used. Latency and FEC code-word length may therefore be reduced as compared to that available for standard OTN framing; G.709 Annex A specifies 16 interleaved codecs. Low latency forward error correction, for example a latency of <4 μs for traffic having a bit rate of 10 Gbit/s, may be provided by adjusting the number of interleaved FEC codecs.

In an embodiment, the forward error correction apparatus comprises a plurality of interleaved forward error correction codecs each configured to apply a first forward error correction code to the information bits and the forward error correction apparatus comprises a plurality of interleaved forward error correction codecs each configured to apply a second forward error correction code to the service channel bits. The second forward error correction code is different to the first forward error correction code. Using different FEC codes for the information bits and the service channel bits may enable flexibility in handling a service channel which not have the same FEC requirements as the information bits of the digital communications traffic.

In an embodiment, the forward error correction apparatus comprises a first plurality of interleaved forward error correction codecs configured to apply forward error correction to the information bits and a second plurality, different to the first plurality, of interleaved forward error correction codecs configured to apply forward error correction to the service channel bits. Using a different number of FEC codecs for the information bits and the service channel bits may enable flexibility in handling a service channel which not have the same latency constraints as the information bits of the digital communications traffic.

In an embodiment, each forward error correction codec of the framer is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, the communications network transmitter further comprises at least one further input, clock and data recovery apparatus, decoder apparatus, framer and line coding apparatus as described above, a plurality of optical receivers, a plurality of further clock and data recovery apparatus, a clock selector, a plurality of deframers, a time division multiplexer, a further framer, further line coding apparatus and a further optical transmitter. Each of the optical receivers is arranged to receive a respective optical signal from a respective one of the transmitters carrying a respective encapsulated digital communications signal. Each of the further clock and data recovery apparatus is arranged to perform clock and data recovery on the respective encapsulated digital communications signal to obtain the respective frames and a respective recovered clock signal. The clock selector is arranged to obtain a clock signal from at least one of the recovered clock signals and to generate and transmit a further clock signal comprising said obtained clock signal. Each of the deframers is arranged to disassemble the frames of the respective decoded digital communications signal and remove the forward error correction coding to obtain the respective service channel bits and information bits. Each of the deframers is also arranged to remove the respective service channel bits of the respective said signal. The time division multiplexer is arranged to time division multiplex the information bits from each of the said signals. The further framer is arranged to add further service channel bits for monitoring or maintenance, apply forward error correction and assemble the further service channel bits and time division multiplexed information bits into frames. The further line coding apparatus is arranged to line code the assembled frames using the output line code to form an encapsulated aggregate digital communications signal for transmission on an optical link. The further optical transmitter arranged to generate and transmit a further optical signal carrying the encapsulated aggregate digital communications signal. Each of the deframers, the multiplexer, the further framer and the further line coding apparatus are arranged to receive the further clock signal and are arranged to operate using the timing of said obtained clock signal.

The communications network transmitter also enables multiplexing of a plurality of FEC protected tributary optical signals into one higher bit rate signal. The multiplexing function is time division based, on the assumption that all the input digital communications signals are frequency synchronous, therefore no phase synchronization is required. Each deframer terminates FEC and removes service channel bits from the tributary optical signals, while the further framer introduces FEC encoding for aggregate signal.

In an embodiment, the clock selector is arranged to obtain the clock signal by one of arbitrarily selecting one of the recovered clock signals, selecting a most accurate one of the recovered clock signals and averaging the recovered clock signals. Assuming that all of the input digital communications signals are frequency synchronous enables the clock selector to select an arbitrary one of the recovered clock signals as the clock signal. Where there is some variation in the recovered clock signals the clock selector may be configured to allow an appropriate clock signal to be obtained and distributed.

In an embodiment, each line coding apparatus is a scrambler. A scrambler as defined in section 11.2 of ITU-T Recommendation G.709 may be used.

In an embodiment, each input digital communications signal is a common public radio interface, CPRI, signal as defined in the CPRI Specification. The communications network transmitter may enable robust optical transport of CPRI signals over geographical distances overcoming jitter, latency and delay asymmetry issues associated with standard OTN solutions based on ITU-T G.709. The communications network transmitter may be used to add a light optical transport layer to CPRI client signals without the disadvantages of standard OTN framing. Encapsulating digital communications traffic in this way may enable fulfilment of CPRI jitter requirements, latency control, robustness of error correction, being able to guarantee a bit error rate, BER, $o<10^{-12}$ in challenging scenarios, and compatibility with multiple technologies, for example coarse wavelength division multiplexing, CWDM, and dense wavelength division multiplexing, DWDM, and multiple network topologies, including point to point, ring, and mesh.

In an embodiment, the input line code is one of 8B10B and 64B66B and the output line code is 64B66B. The CPRI line rate may be preserved by substituting 8B10B coding with a more efficient line coding in order to make room for FEC and an in-band OAM channel. In an embodiment, the service channel bits are for an operation, administration and maintenance, OAM, channel.

In an embodiment, the further framer is arranged to apply a Reed-Solomon forward error correction code. In an embodiment, the further framer is arranged to apply a Reed-Solomon (255, 239) code.

In an embodiment, the input line code received at the communications network receiver has a first spectral efficiency and the coding apparatus is arranged to line code the information bits using an output line code having a second spectral efficiency, lower than the first spectral efficiency. Changing the line code that is used to one with a lower spectral efficiency may enable the service channel bits to be removed. This may enable an in band OAM channel to be removed.

In an embodiment, the deframer is arranged to obtain a delay asymmetry of the optical link. The deframer comprises a buffer arranged to buffer the information bits for a time offset substantially equal to the delay asymmetry. This may enable DS/US delay asymmetry to be compensated for, which may enable the communications network transmitter to meet tight requirements for time division duplex, TDD, and multiple-input-multiple-output, MIMO, in the CPRI Specification.

In an embodiment, the buffer is arranged to buffer the information bits for an estimated delay asymmetry. The delay asymmetry is obtained by estimation depending on at least one parameter of the optical link. Estimating the delay asymmetry based on the design of the optical link may enable the buffer to be configured during installation.

In an embodiment, the buffer is arranged to buffer the information bits for a delay asymmetry obtained by measurement. The method of measuring delay asymmetry disclosed in WO2013/139367 may be used. This may enable each buffer to be configured with a real time delay asymmetry, for the real optical link parameters existing at the time.

In an embodiment, the deframer comprises forward error correction apparatus comprising a plurality of forward error correction codecs each configured to perform a preselected forward error correction code. The forward error correction codecs are interleaved and said plurality of forward error correction codecs is such that a latency added by the forward error correction is not greater than a maximum acceptable latency. Control of latency may be achieved by selecting the number of FEC codecs used. Latency may therefore be reduced as compared to that available for standard OTN framing; G.709 Annex A specifies 16 interleaved codecs.

Low latency forward error correction, for example a latency of <4 µs for traffic having a bit rate of 10 Gbit/s, may be provided by adjusting the number of interleaved FEC codecs.

In an embodiment, the deframer comprises forward error correction apparatus comprising a plurality of interleaved forward error correction codecs each configured to perform forward error correction using a first forward error correction code on the information bits and the forward error correction apparatus comprises a plurality of interleaved forward error correction codecs each configured to perform forward error correction using a second forward error correction code on the service channel bits. The second forward error correction code is different to the first forward error correction code. Using different FEC codes for the information bits and the service channel bits may enable flexibility in handling a service channel which not have the same FEC requirements as the information bits of the digital communications traffic.

In an embodiment, each forward error correction codec of the deframer is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, the communications network receiver further comprises a time division demultiplexer, a plurality of framers, at least one further coding apparatus and at least one further digital transmitter. The time division demultiplexer is arranged to receive the information bits from the deframer and is arranged to time division demultiplex the information bits. Each of the framers is arranged to receive respective information bits from the time division multiplexer and is arranged to assemble the information bits into frames. Each coding apparatus is arranged to line code the respective framed information bits using the output line code to form a respective output digital communications signal for transmission on a digital communications link. Each digital transmitter is arranged to generate and transmit the respective output digital communications signal. The time division multiplexer, the framers, the at least one further coding apparatus and the at least one further digital transmitter are each arranged to receive the clock signal and are each arranged to operate using the timing of the recovered clock signal.

A sixth aspect of the invention provides a communications network base station comprising at least two communications network base station nodes and at least one optical link connecting said two nodes. Each communications network base station node comprises at least one of a communications network transmitter and a communications network receiver. The communications network transmitter comprises an input, clock and data recovery apparatus, decoder apparatus, a framer, line coding apparatus and an optical transmitter. The input is arranged to receive an input digital communications signal having an input line code. The clock and data recovery apparatus is arranged to perform clock and data recovery on the input digital communications signal to obtain input line coded digital communications traffic and a recovered clock signal. The clock and data recovery apparatus is arranged to generate and transmit a clock signal comprising the recovered clock signal. The decoder apparatus is arranged to decode the input digital communications traffic to obtain information bits and non-information bits, and to remove the non-information bits. The framer is arranged to receive the information bits and service channel bits for monitoring or maintenance, and to assemble the service channel bits and information bits into frames. The line coding apparatus is arranged to line code the assembled frames using an output line code to form an encapsulated digital communications signal for transmission on an optical link. The optical transmitter is arranged to generate and transmit an optical signal carrying the encapsulated digital communications signal. Each of the decoder apparatus, the framer and the line coding apparatus are arranged to receive the clock signal and are arranged to operate using the timing of the recovered clock signal. The communications network receiver comprises an input, clock and data recovery apparatus, a deframer, coding apparatus and a digital transmitter. The input is arranged to receive an optical signal carrying an encapsulated digital communications signal having an input line code. The clock and data recovery apparatus is arranged to perform clock and data recovery on the encapsulated digital communications signal to obtain digital communications traffic frames and a recovered clock signal. The clock and data recovery apparatus is arranged to generate and transmit a clock signal comprising the recovered clock signal. The deframer is arranged to disassemble the digital communications traffic frames to obtain information bits and service channel bits for monitoring or maintenance, and is arranged to remove the service channel bits. The coding apparatus is arranged to line code the information bits using an output line code to form an output digital communications signal for transmission on a digital communications link. The digital transmitter is arranged to generate and transmit the output digital communications signal. The deframer, the coding apparatus and the digital transmitter are each arranged to receive the clock signal and are each arranged to operate using the timing of the recovered clock signal.

By removing the non-information bits from the input digital communications signal the communications network transmitter makes capacity available to add the service channel bits, which may enable it to add a service channel for monitoring or maintenance to the input signal. The communications network transmitter may enable a 'light optical transport layer' to be added to digital communications traffic client signals without one or more of the disadvantages of standard OTN framing. Using the timing of the recovered clock signal for steps c. to g. may enable communications network transmitter to transmit an input digital communications signal into an optical line with no synchronization accuracy degradation from input to line. Removing the service channel bits at the receiver may enable non-information bits to be added, to facilitate conversion to an output line code suitable for transmission on a digital communications link. Using the timing of the recovered clock signal for the deframer, the coding apparatus and the digital transmitter may enable an encapsulated digital communications signal received from an optical link to be transmitted into digital communications link with no synchronization accuracy degradation from input to digital link.

In an embodiment, the input line code received at the communications network transmitter has a first spectral efficiency and the line coding apparatus is arranged to line code the assembled frames using an output line code having a second spectral efficiency, higher than the first spectral efficiency. Changing the line code that is used to one with a higher spectral efficiency may make room to add the service channel bits. This may enable an in band OAM channel to be added to the input signal.

In an embodiment, the framer is arranged to obtain a delay asymmetry of the optical link. The framer comprises a buffer arranged to buffer the information bits for a time offset substantially equal to the delay asymmetry. This may enable DS/US delay asymmetry to be compensated for, which may enable the communications network transmitter to meet tight requirements for time division duplex, TDD, and multiple-input-multiple-output, MIMO, in the CPRI Specification.

In an embodiment, the framer also comprises a buffer arranged to buffer the service channel bits for a time offset substantially equal to the delay asymmetry. This may enable additional compensation for DS/US delay asymmetry to be achieved.

In an embodiment, each buffer is arranged to buffer the respective bits for an estimated delay asymmetry. The delay asymmetry is obtained by estimation depending on at least one parameter of the optical link. Estimating the delay asymmetry based on the design of the optical link may enable the buffer to be configured during installation.

In an embodiment, each buffer is arranged to buffer the respective bits for a delay asymmetry obtained by measurement. The method of measuring delay asymmetry disclosed in WO2013/139367 may be used. This may enable each buffer to be configured with a real time delay asymmetry, for the real optical link parameters existing at the time.

In an embodiment, the framer comprises forward error correction apparatus comprising a plurality of forward error correction codecs. Each forward error correction codec is configured to apply a preselected forward error correction code. The forward error correction codecs are interleaved and said plurality of interleaved forward error correction codecs is such that a latency added by the forward error correction is not greater than a maximum acceptable latency. Removing the non-information bits from the input digital communications signal makes capacity available to apply forward error correction, FEC, before transmission on the optical link. Control of latency and FEC code-word length may be achieved by selecting the number of FEC codecs used. Latency and FEC code-word length may therefore be reduced as compared to that available for standard OTN framing; G.709 Annex A specifies 16 interleaved codecs. Low latency forward error correction, for example a latency of <4 µs for traffic having a bit rate of 10 Gbit/s, may be provided by adjusting the number of interleaved FEC codecs.

In an embodiment, the forward error correction apparatus comprises a plurality of interleaved forward error correction codecs each configured to apply a first forward error correction code to the information bits and the forward error correction apparatus comprises a plurality of interleaved forward error correction codecs each configured to apply a second forward error correction code to the service channel bits. The second forward error correction code is different to the first forward error correction code. Using different FEC codes for the information bits and the service channel bits may enable flexibility in handling a service channel which not have the same FEC requirements as the information bits of the digital communications traffic.

In an embodiment, the forward error correction apparatus comprises a first plurality of interleaved forward error correction codecs configured to apply forward error correction to the information bits and a second plurality, different to the first plurality, of interleaved forward error correction codecs configured to apply forward error correction to the service channel bits. Using a different number of FEC codecs for the information bits and the service channel bits may enable flexibility in handling a service channel which not have the same latency constraints as the information bits of the digital communications traffic.

In an embodiment, each forward error correction codec of the framer is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, the communications network transmitter further comprises at least one further input, clock and data recovery apparatus, decoder apparatus, framer and line coding apparatus as described above, a plurality of optical receivers, a plurality of further clock and data recovery apparatus, a clock selector, a plurality of deframers, a time division multiplexer, a further framer, further line coding apparatus and a further optical transmitter. Each of the optical receivers is arranged to receive a respective optical signal from a respective one of the transmitters carrying a respective encapsulated digital communications signal. Each of the further clock and data recovery apparatus is arranged to perform clock and data recovery on the respective encapsulated digital communications signal to obtain the respective frames and a respective recovered clock signal. The clock selector is arranged to obtain a clock signal from at least one of the recovered clock signals and to generate and transmit a further clock signal comprising said obtained clock signal. Each of the deframers is arranged to disassemble the frames of the respective decoded digital communications signal and remove the forward error correction coding to obtain the respective service channel bits and information bits. Each of the deframers is also arranged to remove the respective service channel bits of the respective said signal. The time division multiplexer is arranged to time division multiplex the information bits from each of the said signals. The further framer is arranged to add further service channel bits for monitoring or maintenance, apply forward error correction and assemble the further service channel bits and time division multiplexed information bits into frames. The further line coding apparatus is arranged to line code the assembled frames using the output line code to form an encapsulated aggregate digital communications signal for transmission on an optical link. The further optical transmitter arranged to generate and transmit a further optical signal carrying the encapsulated aggregate digital communications signal. Each of the deframers, the multiplexer, the further framer and the further line coding apparatus are arranged to receive the further clock signal and are arranged to operate using the timing of said obtained clock signal.

The communications network transmitter also enables multiplexing of a plurality of FEC protected tributary optical signals into one higher bit rate signal. The multiplexing function is time division based, on the assumption that all the input digital communications signals are frequency synchronous, therefore no phase synchronization is required. Each deframer terminates FEC and removes service channel bits from the tributary optical signals, while the further framer introduces FEC encoding for aggregate signal.

In an embodiment, the clock selector is arranged to obtain the clock signal by one of arbitrarily selecting one of the recovered clock signals, selecting a most accurate one of the recovered clock signals and averaging the recovered clock signals. Assuming that all of the input digital communications signals are frequency synchronous enables the clock selector to select an arbitrary one of the recovered clock signals as the clock signal. Where there is some variation in the recovered clock signals the clock selector may be configured to allow an appropriate clock signal to be obtained and distributed.

In an embodiment, each line coding apparatus is a scrambler. A scrambler as defined in section 11.2 of ITU-T Recommendation G.709 may be used.

In an embodiment, each input digital communications signal is a common public radio interface, CPRI, signal as defined in the CPRI Specification. The communications network transmitter may enable robust optical transport of CPRI signals over geographical distances overcoming jitter, latency and delay asymmetry issues associated with standard OTN solutions based on ITU-T G.709. The communications network transmitter may be used to add a light optical transport layer to CPRI client signals without the disadvantages of standard OTN framing. Encapsulating digital communications traffic in this way may enable fulfilment of CPRI jitter requirements, latency control, robustness of error correction, being able to guarantee a bit error rate, BER, $o<10^{-12}$ in challenging scenarios, and compatibility with multiple technologies, for example coarse wavelength division multiplexing, CWDM, and dense wavelength division multiplexing, DWDM, and multiple network topologies, including point to point, ring, and mesh.

In an embodiment, the input line code is one of 8B10B and 64B66B and the output line code is 64B66B. The CPRI line rate may be preserved by substituting 8B10B coding with a more efficient line coding in order to make room for FEC and an in-band OAM channel. In an embodiment, the service channel bits are for an operation, administration and maintenance, OAM, channel.

In an embodiment, the further framer is arranged to apply a Reed-Solomon forward error correction code. In an embodiment, the further framer is arranged to apply a Reed-Solomon (255, 239) code.

In an embodiment, the input line code received at the communications network receiver has a first spectral efficiency and the coding apparatus is arranged to line code the information bits using an output line code having a second spectral efficiency, lower than the first spectral efficiency. Changing the line code that is used to one with a lower spectral efficiency may enable the service channel bits to be removed. This may enable an in band OAM channel to be removed.

In an embodiment, the deframer is arranged to obtain a delay asymmetry of the optical link. The deframer comprises a buffer arranged to buffer the information bits for a time offset substantially equal to the delay asymmetry. This may enable DS/US delay asymmetry to be compensated for, which may enable the communications network transmitter to meet tight requirements for time division duplex, TDD, and multiple-input-multiple-output, MIMO, in the CPRI Specification.

In an embodiment, the buffer is arranged to buffer the information bits for an estimated delay asymmetry. The delay asymmetry is obtained by estimation depending on at least one parameter of the optical link. Estimating the delay asymmetry based on the design of the optical link may enable the buffer to be configured during installation.

In an embodiment, the buffer is arranged to buffer the information bits for a delay asymmetry obtained by measurement. The method of measuring delay asymmetry disclosed in WO2013/139367 may be used. This may enable each buffer to be configured with a real time delay asymmetry, for the real optical link parameters existing at the time.

In an embodiment, the deframer comprises forward error correction apparatus comprising a plurality of forward error correction codecs each configured to perform a preselected forward error correction code. The forward error correction codecs are interleaved and said plurality of forward error correction codecs is such that a latency added by the forward error correction is not greater than a maximum acceptable latency. Control of latency may be achieved by selecting the number of FEC codecs used. Latency may therefore be reduced as compared to that available for standard OTN framing; G.709 Annex A specifies 16 interleaved codecs. Low latency forward error correction, for example a latency of <4 μs for traffic having a bit rate of 10 Gbit/s, may be provided by adjusting the number of interleaved FEC codecs.

In an embodiment, the deframer comprises forward error correction apparatus comprising a plurality of interleaved forward error correction codecs each configured to perform forward error correction using a first forward error correction code on the information bits and the forward error correction apparatus comprises a plurality of interleaved forward error correction codecs each configured to perform forward error correction using a second forward error correction code on the service channel bits. The second forward error correction code is different to the first forward error correction code. Using different FEC codes for the information bits and the service channel bits may enable flexibility in handling a service channel which not have the same FEC requirements as the information bits of the digital communications traffic.

In an embodiment, each forward error correction codec of the deframer is configured to apply a Reed-Solomon forward error correction code. In an embodiment, each forward error correction codec is configured to apply a Reed-Solomon (255, 239) code. In an embodiment, four interleaved forward error correction codecs each configured to apply a Reed-Solomon (255, 239) code are used. This may enable a lower latency to be achieved than is possible for the optical transport network, OTN, standard as defined in Annex A of ITU-T Recommendation G.709, which uses 16-byte interleaved codecs using a Reed-Solomon (255, 239) code.

In an embodiment, the communications network receiver further comprises a time division demultiplexer, a plurality of framers, at least one further coding apparatus and at least one further digital transmitter. The time division demultiplexer is arranged to receive the information bits from the deframer and is arranged to time division demultiplex the information bits. Each of the framers is arranged to receive respective information bits from the time division multiplexer and is arranged to assemble the information bits into frames. Each coding apparatus is arranged to line code the respective framed information bits using the output line code to form a respective output digital communications signal for transmission on a digital communications link. Each digital transmitter is arranged to generate and transmit the respective output digital communications signal. The time division multiplexer, the framers, the at least one further coding apparatus and the at least one further digital transmitter are each arranged to receive the clock signal and are each arranged to operate using the timing of the recovered clock signal.

A seventh aspect of the invention provides a data carrier having computer readable instructions embodied therein. The said computer readable instructions are for providing access to resources available on a processor. The computer readable instructions comprise instructions to cause the processor to perform any of the above steps of the method of encapsulating digital communications traffic for transmission on an optical link.

In an embodiment, the data carrier is a non-transitory data carrier.

An eighth aspect of the invention provides a data carrier having computer readable instructions embodied therein. The said computer readable instructions are for providing access to resources available on a processor. The computer readable instructions comprise instructions to cause the processor to perform any of the above steps of the method converting encapsulated digital communications traffic for transmission on a digital communications link.

In an embodiment, the data carrier is a non-transitory data carrier.

Embodiments of the invention will now be described, by way of example only, with reference to the accompanying drawings.

DETAILED DESCRIPTION

Figure 1:
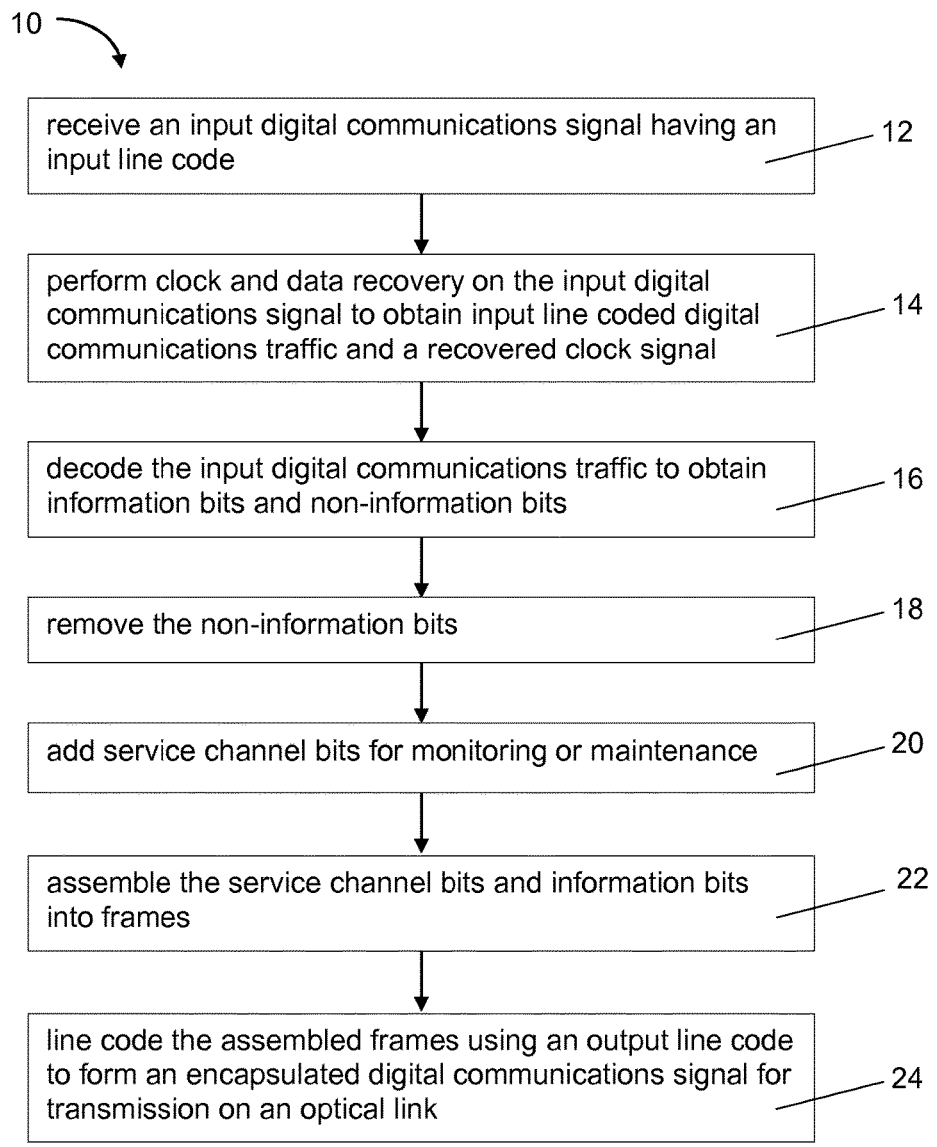
FIG. 1 shows the steps of a method according to a first embodiment of the invention of encapsulating digital communications traffic for transmission on an optical link.

Referring to FIG. 1, a first embodiment of the invention provides a method 10 of encapsulating digital communications traffic for transmission on an optical link.

The method 10 comprises the following steps:

a. receiving an input digital communications signal having an input line code 12;

b. performing clock and data recovery on the input digital communications signal to obtain input line coded digital communications traffic and a recovered clock signal 14;

c. decoding the input digital communications traffic to obtain information bits and non-information bits 16;

d. removing the non-information bits 18;

e. adding service channel bits for monitoring or maintenance 20;

f. assembling the service channel bits and information bits into frames 22; and g. line coding the assembled frames using an output line code to form an encapsulated digital communications signal for transmission on an optical link 24.

Steps c. to g. are performed using the timing of the recovered clock signal.

Figure 2:
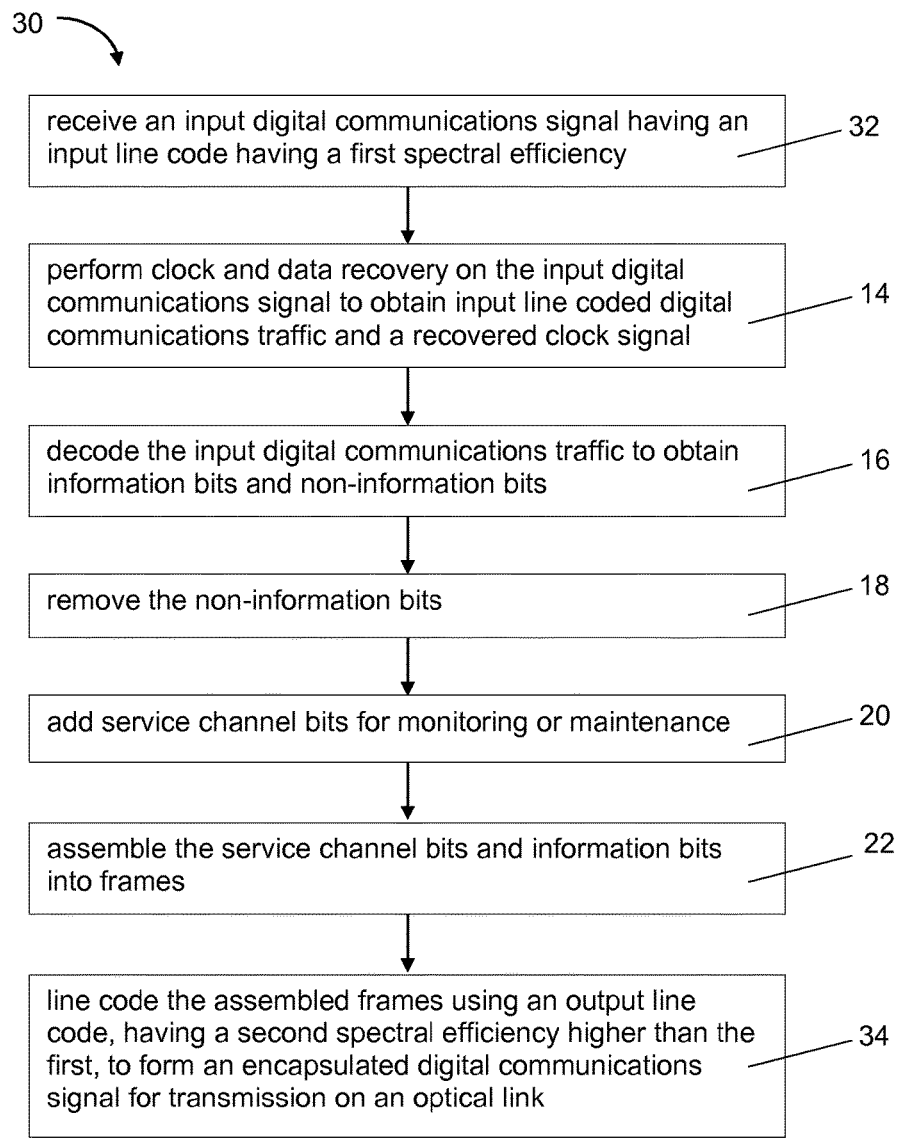
FIG. 2 shows the steps of a method according to a second embodiment of the invention of encapsulating digital communications traffic for transmission on an optical link.

FIG. 2 shows the steps of a method 30 according to a second embodiment of the invention of encapsulating digital communications traffic for transmission on an optical link. The method 30 of this embodiment is similar to the method 10 shown in FIG. 1, with the following modifications. The same reference numbers are retained for corresponding steps.

In this embodiment, the input line code has a first spectral efficiency 32 and the output line code has a second spectral efficiency 34. The second spectral efficiency is higher than the first spectral efficiency.

In a third embodiment of the invention, described with reference to FIG. 1, the input digital communications signal 12 is a CPRI signal having a 64B66B line code. The output line code 24 is also a 64B66B line code.

In a fourth embodiment of the invention, described with reference to FIG. 2, the input digital communications signal 32 is a CPRI signal having an 8B10B line code. The output line code 34 is a 64B66B line code, which the person skilled in the art will understand has a higher spectral efficiency that 8B10B.

Figure 3:
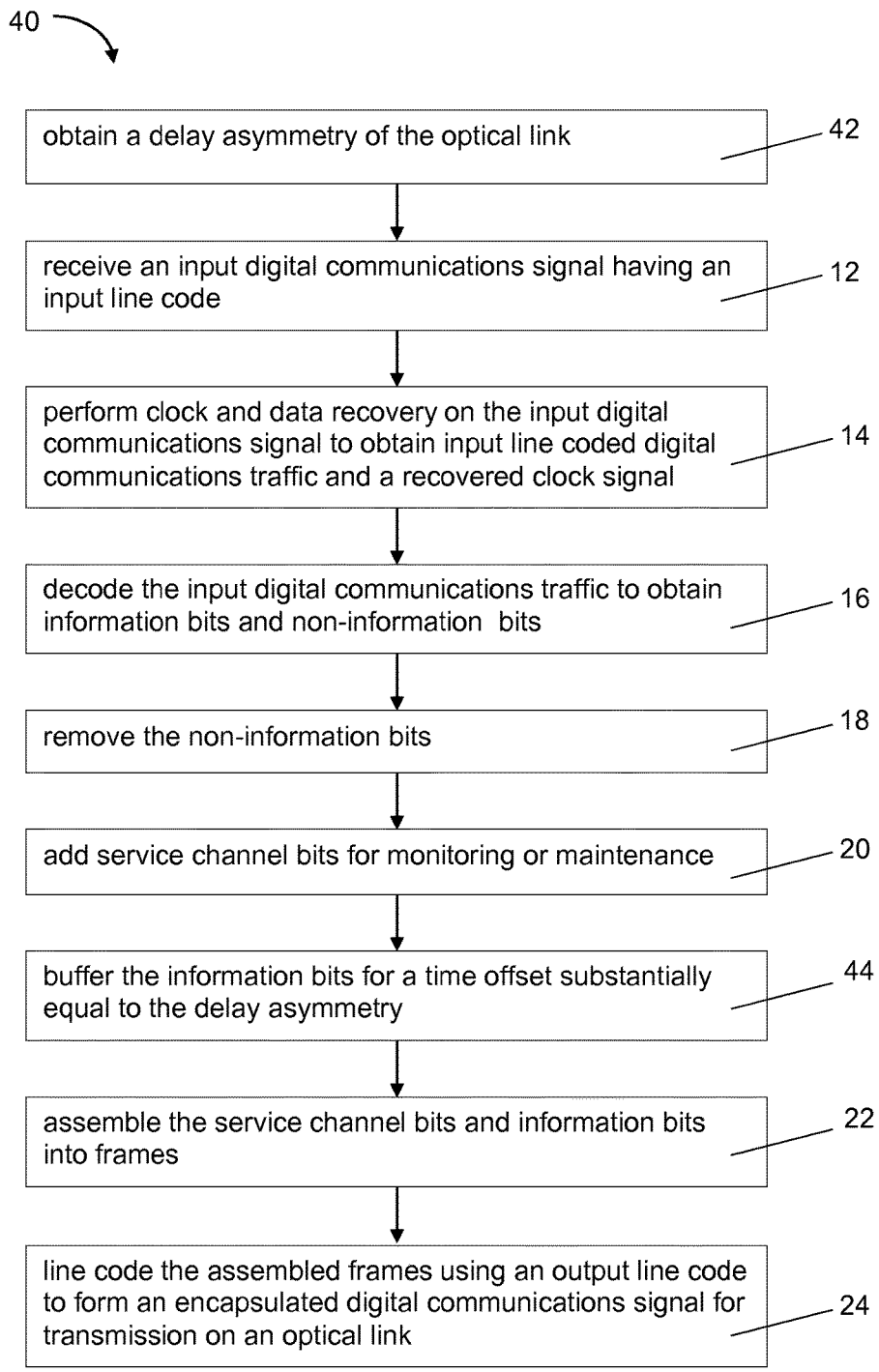
FIG. 3 shows the steps of a method according to a fifth embodiment of the invention of encapsulating digital communications traffic for transmission on an optical link.

Referring to FIG. 3, a fifth embodiment of the invention provides a method 40 of encapsulating digital communications traffic for transmission on an optical link which is similar to the method 10 shown in FIG. 1, with the following modifications. The same reference numbers are retained for corresponding steps.

In this embodiment, the method further comprises obtaining an upstream/downstream, US/DS, delay asymmetry of the optical link 42. Step f. comprises buffering the information bits for a time offset substantially equal to the delay asymmetry 44.

The delay asymmetry may be obtained by estimation depending on at least one parameter of the optical link or it may be obtained by measurement. The method of measuring delay asymmetry disclosed in WO2013/139367 may be used to obtain the delay asymmetry.

It is not necessary to buffer the service channel bits but it can be done if desired.

Figure 4:
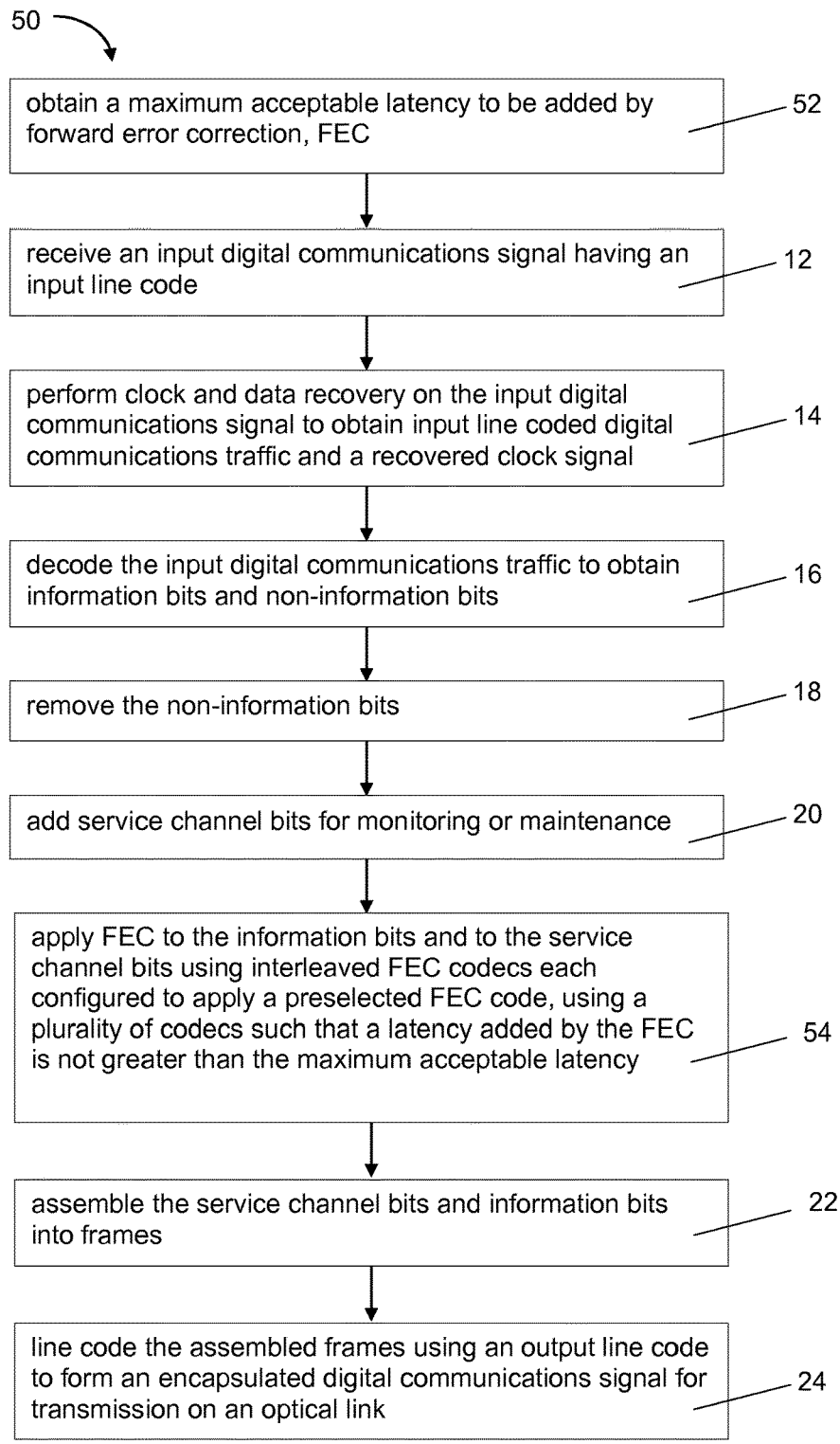
FIG. 4 shows the steps of a method according to a sixth embodiment of the invention of encapsulating digital communications traffic for transmission on an optical link.

FIG. 4 shows the steps of a method 50 according to a sixth embodiment of the invention of encapsulating digital communications traffic for transmission on an optical link. The method 50 of this embodiment is similar to the method 10 shown in FIG. 1, with the following modifications. The same reference numbers are retained for corresponding steps.

In this embodiment, step f. comprises applying forward error correction, FEC, to the information bits and to the service channel bits using a plurality of interleaved FEC codecs. Each FEC codec is configured to apply a preselected FEC code. The method 50 comprises obtaining a maximum acceptable latency to be added by the forward error correction 52. The number of FEC codecs used is then selected so that a latency added by the forward error correction process is not greater than the maximum acceptable latency 54.

By way of example, each FEC code may be a Reed-Solomon code, such as a Reed-Solomon (255, 239) code.

Figure 5:
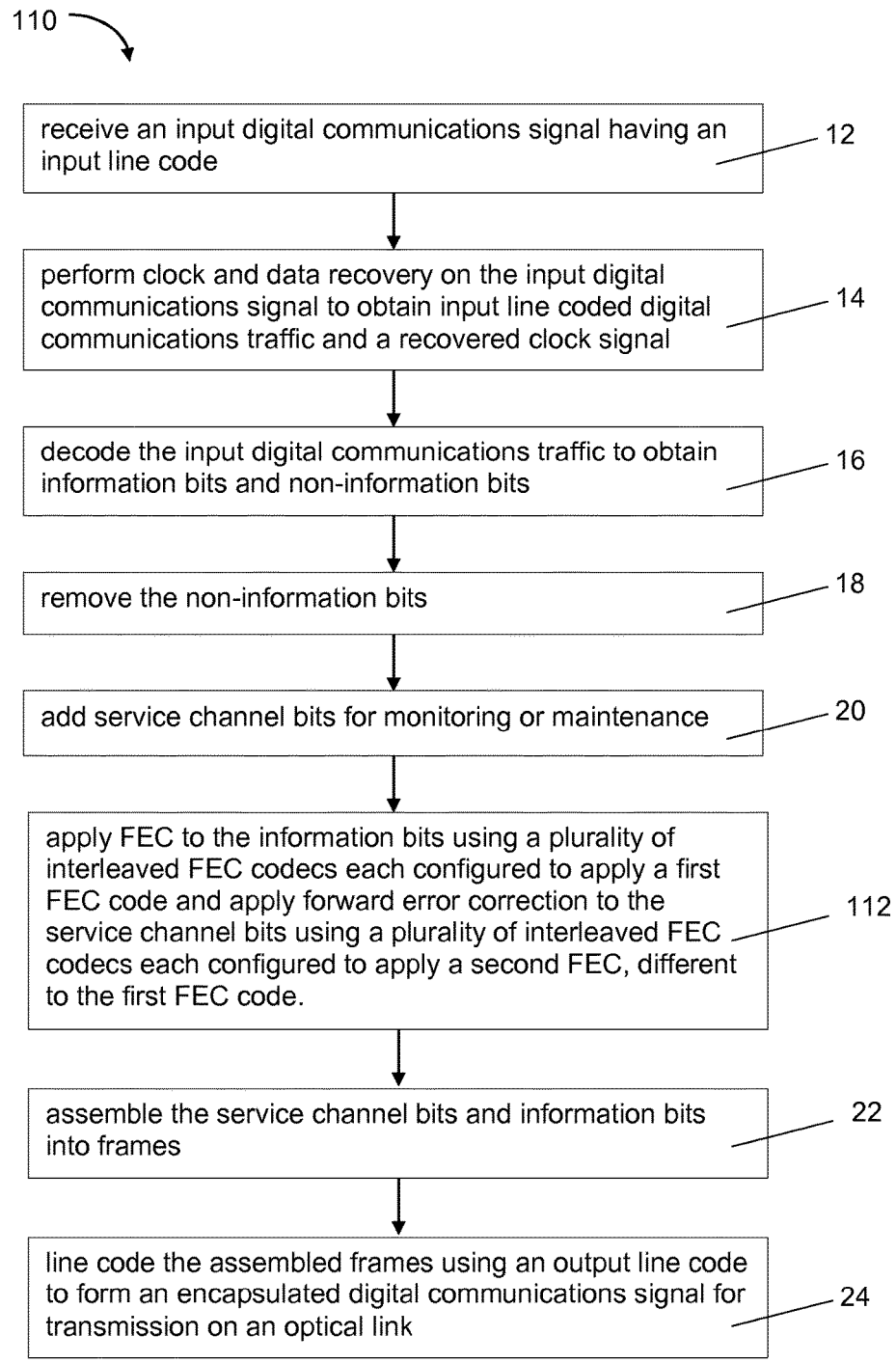
FIG. 5 shows the steps of a method according to a seventh embodiment of the invention of encapsulating digital communications traffic for transmission on an optical link.

FIG. 5 shows the steps of a method 110 according to a seventh embodiment of the invention of encapsulating digital communications traffic for transmission on an optical link. The method 110 of this embodiment is similar to the method 10 shown in FIG. 1, with the following modifications. The same reference numbers are retained for corresponding steps.

In this embodiment, forward error correction is applied in step f. to the information bits using a plurality of interleaved FEC codecs each configured to apply a first FEC code. Forward error correction is also applied to the service channel bits in step f. but it is done using a plurality of interleaved FEC codecs each configured to apply a second FEC code, different to the first FEC code 112.

By way of example, the FEC code may be a Reed-Solomon code, such as a Reed-Solomon (255, 239) code. Optionally, the number of interleaved FEC codecs used may be selected, as in the previous embodiment, to control the latency added by the FEC processing. For example, four interleaved FEC codecs may be used for each of the information bits and the service channel bits, to achieve a lower latency that is possible using the 16-byte interleaved codecs using a Reed-Solomon (255, 239) code specified for the OTN in Annex A of ITU-T Recommendation G.709.

Figure 6A:
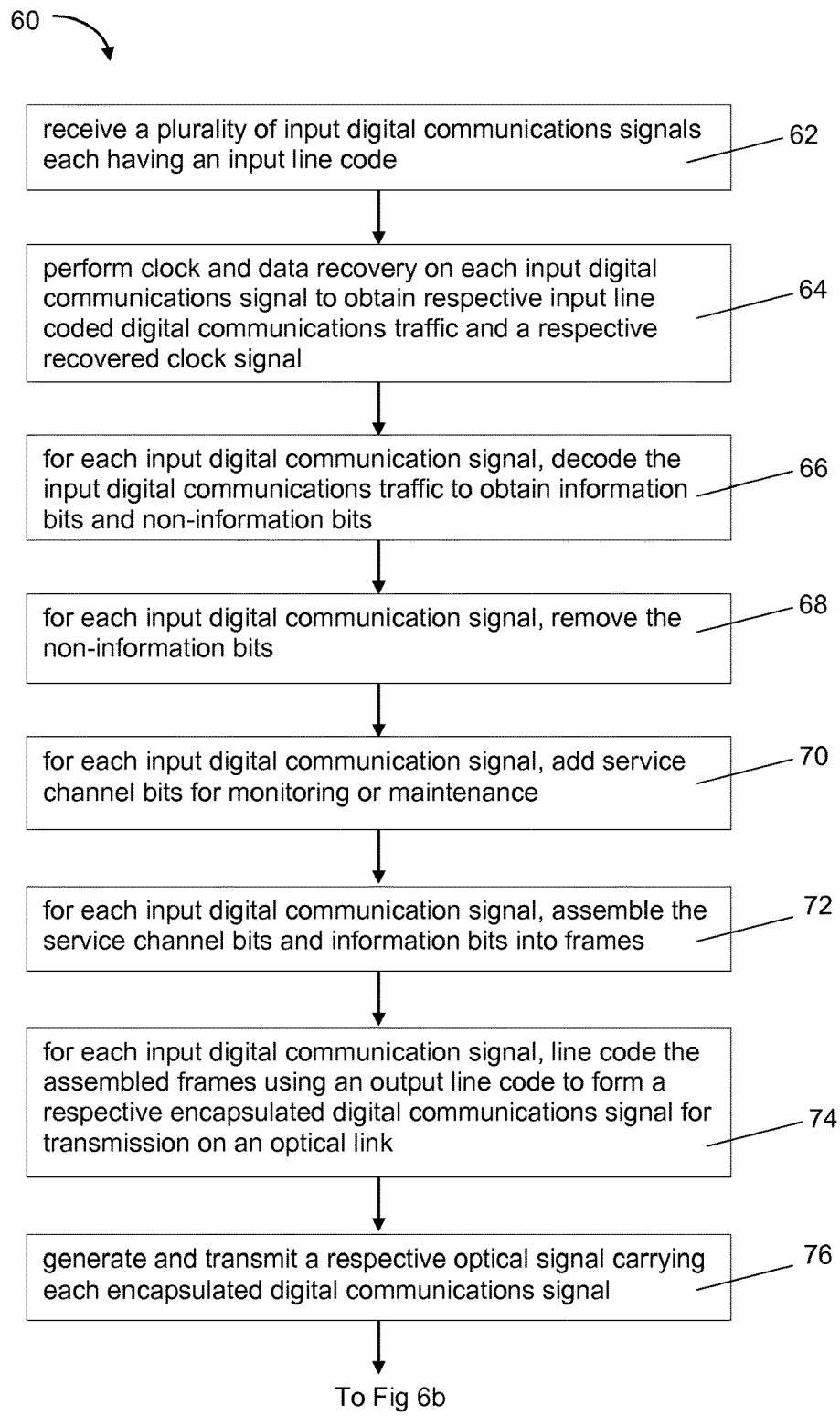
FIG. 6a shows some of the steps of a method according to an eighth embodiment of the invention of encapsulating digital communications traffic for transmission on an optical link.
Figure 6B:
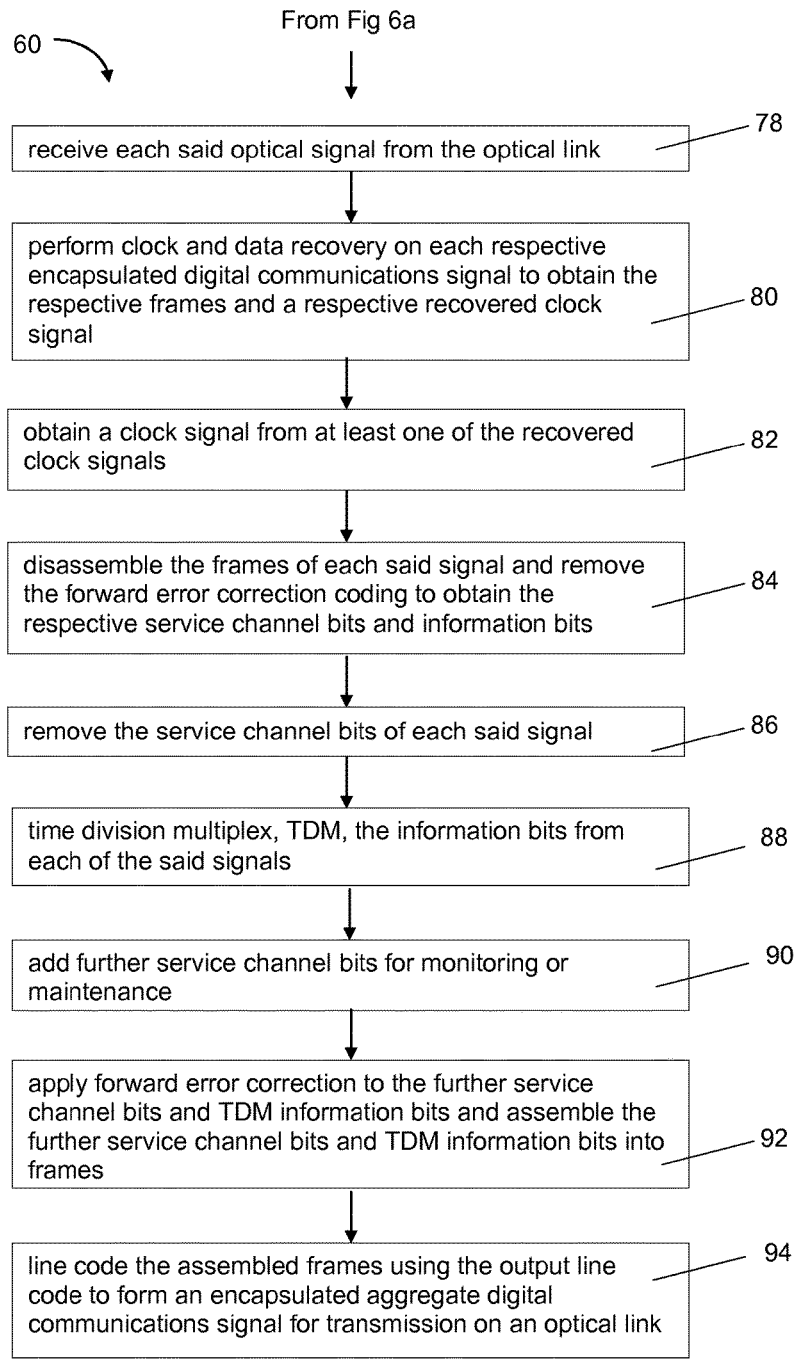
FIG. 6b shows the rest of the steps of the method according to the eighth embodiment of the invention.

Referring to FIGS. 6a and 6b, an eighth embodiment of the invention provides a method 60 of encapsulating digital communications traffic for transmission on an optical link.

The method 60 comprises:

a. receiving a plurality of input digital communications signal having an input line code 62;

b. for each input digital communications signal, performing clock and data recovery to obtain respective input line coded digital communications traffic and a respective recovered clock signal 64;

c. for each input digital communications signal, decoding the input digital communications traffic to obtain information bits and non-information bits 66;

d. for each input digital communications signal, removing the non-information bits 68;

e. for each input digital communications signal, adding service channel bits for monitoring or maintenance 70;

f. for each input digital communications signal, assembling the service channel bits and information bits into frames 72;

g. for each input digital communications signal, line coding the assembled frames using an output line code to form a respective encapsulated digital communications signal for transmission on an optical link 74; and h. generate and transmit a respective optical signal carrying each encapsulated digital communications signal 76.

For each input digital communications signal, steps c. to g. are performed using the timing of the respective recovered clock signal.

The method 60 further comprises:

i. receiving each optical signal carrying a respective encapsulated digital communications signal 78;

ii. performing clock and data recovery on each respective encapsulated digital communications signal to obtain the respective frames and a respective recovered clock signal 80;

iii. obtaining a clock signal from at least one of the recovered clock signals 82;

iv. disassembling the frames of each said signal and removing the forward error correction coding to obtain the respective service channel bits and information bits 84, and removing the respective service channel bits of each said signal 86;

v. time division multiplexing, TDM, the information bits from each of the said signals 88;

vi. adding further service channel bits for monitoring or maintenance 90;

vii. applying forward error correction to the further service channel bits and time division multiplexed, TDM, information bits and assembling the further service channel bits and time division multiplexed information bits into frames 92; and viii. line coding the assembled frames using the output line code to form an encapsulated aggregate digital communications signal for transmission on an optical link 94.

Steps v. to viii. are performed using the timing of the clock signal obtained in step iii.

Figure 7:
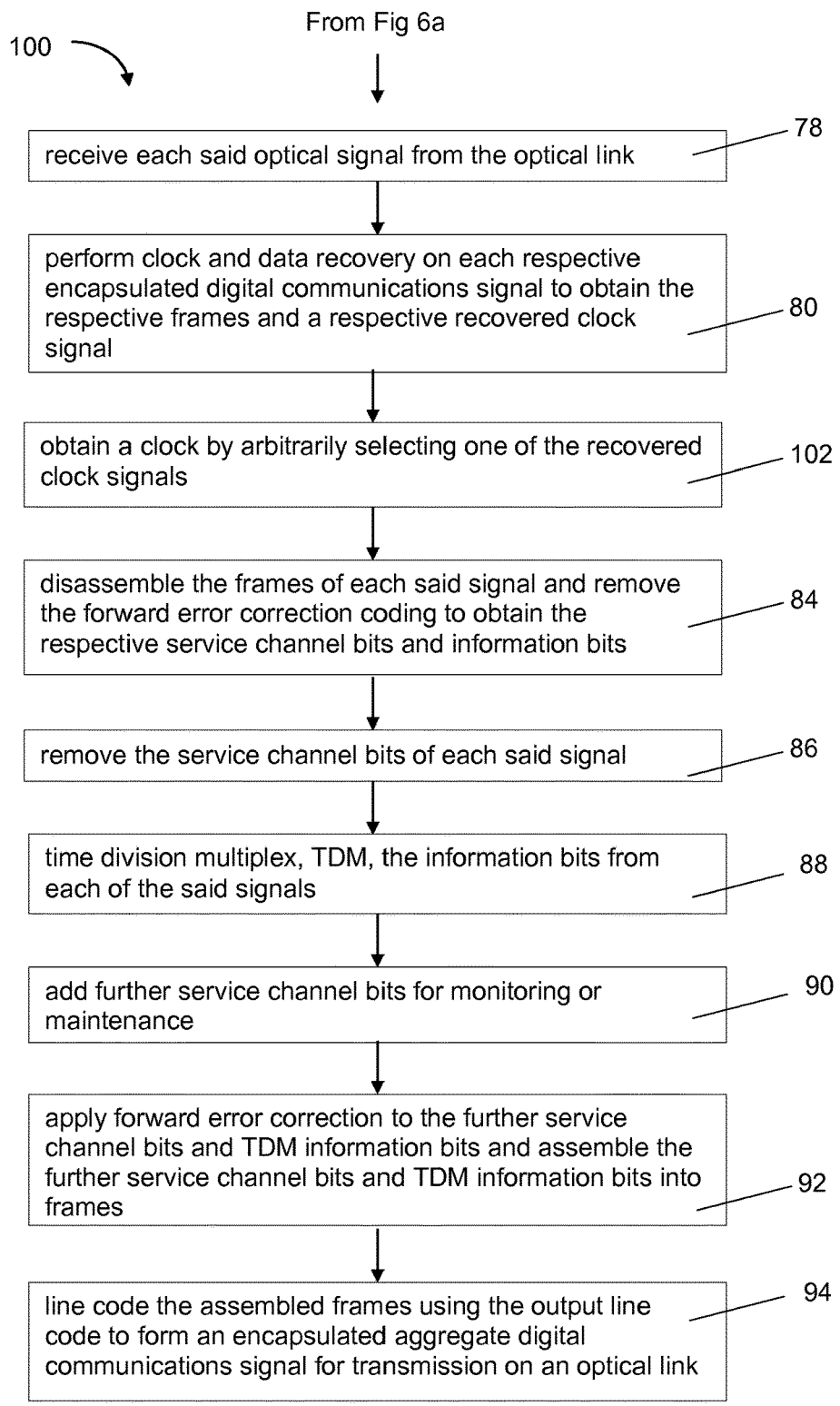
FIG. 7 shows some of the steps of a method according to a ninth embodiment of the invention of encapsulating digital communications traffic for transmission on an optical link.

Referring to FIG. 7, a ninth embodiment of the invention provides a method 100 of encapsulating digital communications traffic for transmission on an optical link. The method 100 of this embodiment is similar to the method 60 shown in FIGS. 6a and 6b, with the following modifications. The same reference numbers are retained for corresponding steps.

In this embodiment, in step iii. the clock signal is obtained by arbitrarily selecting one of the recovered clock signals 102. This assumes that all of the input digital communications signals are frequency synchronous, and all the recovered clock signals are therefore equivalent. If they are not, the clock signal may be obtained in step iii. by selecting a most accurate one of the recovered clock signals or by averaging the recovered clock signals.

Figure 8:
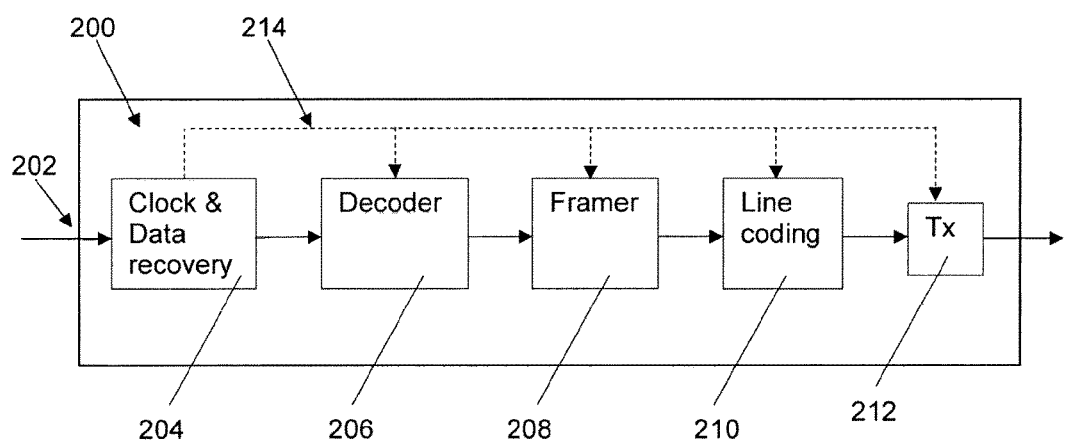
FIG. 8 is a schematic representation of a communications network transmitter according to a tenth embodiment of the invention.

A tenth embodiment of the invention provides a communications network transmitter 200 as shown in FIG. 8. The transmitter 200 comprises an input 202, clock and data recovery apparatus 204, decoder apparatus 206, a framer 208, line coding apparatus 210 and an optical transmitter 212.

The input 202 is arranged to receive an input digital communications signal having an input line code.

The clock and data recovery apparatus 204 is arranged to perform clock and data recovery on the input digital communications signal to obtain input line coded digital communications traffic and a recovered clock signal. The clock and data recovery apparatus 204 is also arranged to generate and transmit a clock signal 214, comprising the recovered clock signal, to the decoder, the framer, the line coding apparatus and the optical transmitter. Each of the decoder apparatus, the framer and the line coding apparatus are arranged to receive the clock signal and are arranged to operate using the timing of the recovered clock signal.

The decoder apparatus 206 is arranged to decode the input digital communications traffic to obtain information bits and non-information bits. The decoder apparatus 206 is also arranged to remove the non-information bits.

The framer 208 is arranged to receive the information bits and is arranged to receive service channel bits for monitoring or maintenance. The framer is arranged to assemble the service channel bits and information bits into frames.

The line coding apparatus 210 is arranged to line code the assembled frames using an output line code to form an encapsulated digital communications signal for transmission on an optical link.

The optical transmitter 212 is arranged to generate and transmit an optical signal carrying the encapsulated digital communications signal.

Figure 9:
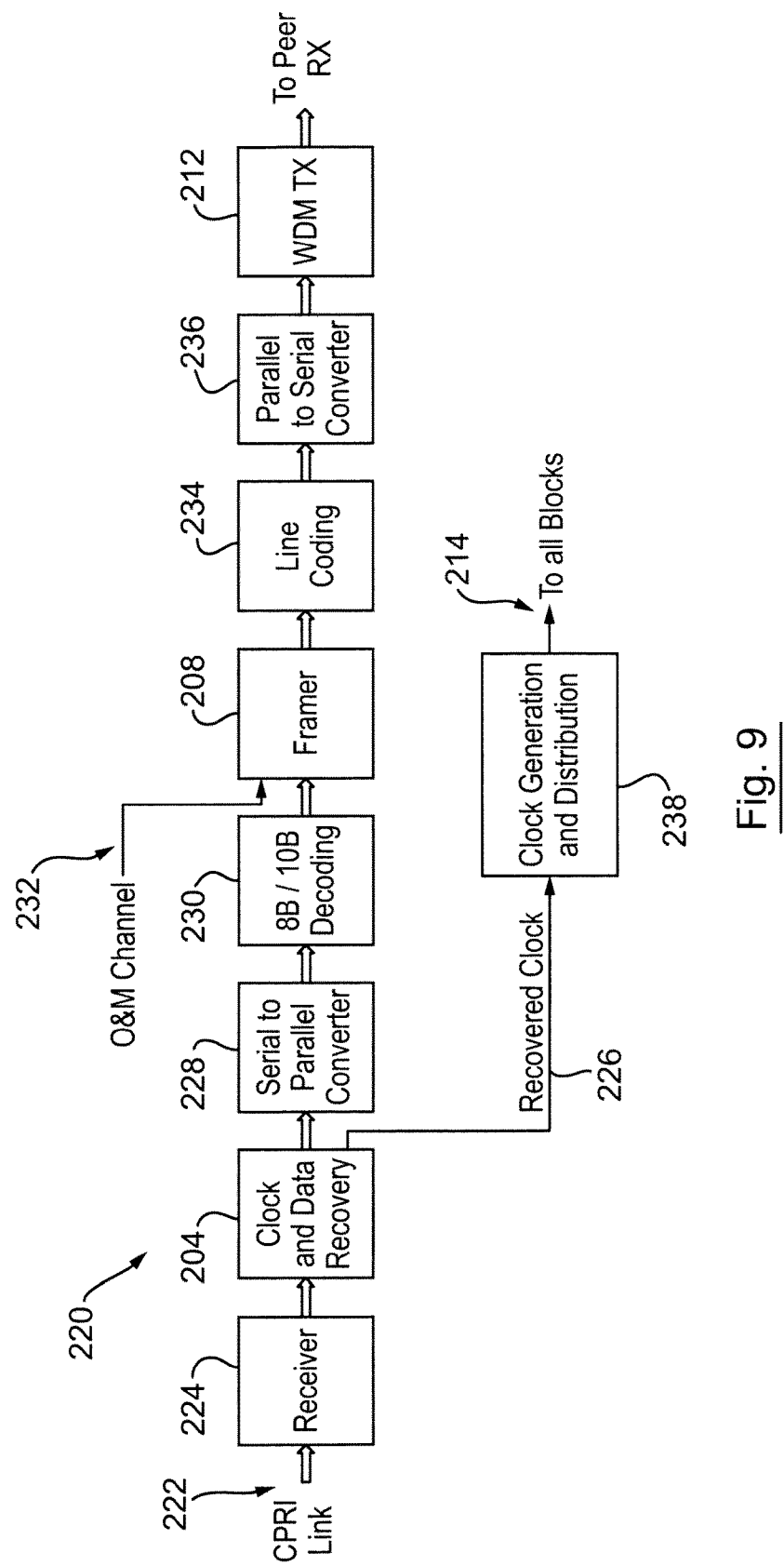
FIG. 9 is a schematic representation of a communications network transmitter according to an eleventh embodiment of the invention.

An eleventh embodiment of the invention provides a communications network transmitter 220 as shown in FIG. 9. The communications network transmitter of this embodiment is similar to the communications network transmitter 200 shown in FIG. 8, with the following modifications. The same reference numbers are retained for corresponding features.

In this embodiment, the input digital communications signal 222 is a CPRI signal having 8B10B line coding.

The transmitter 220 additionally comprises a receiver 224, a serial to parallel converter 228, clock signal generation and distribution apparatus 238, and a parallel to serial converter 236.

The receiver 224 is arranged to receive the CPRI signal 222 and deliver it to the clock and data recovery apparatus 204. The recovered clock signal 226 is sent to the clock signal generation and distribution apparatus, which is arranged to generate and transmit the clock signal 214 to the serial to parallel converter 228, decoder apparatus 230, framer 208, line coding apparatus 234, parallel to serial converter 236 and the transmitter 212.

The serial to parallel converter 228 converts the CPRI signal 222 into a plurality of parallel signals for parallel processing by the decoder apparatus 230, the framer 208 and the line coding apparatus 234. The parallel to serial converter 236 receives a plurality of encapsulated digital communications signals and converts them into a single encapsulated digital communications signal for transmission by the transmitter 212. It will be appreciated that the serial to parallel converter 228 and the parallel to serial converter 236 are not essential but their use may increase the overall processing speed achievable by the decoder apparatus, framer and line coding apparatus.

The decoder apparatus 230 is arranged to decode the parallel 8B10B coded CPRI signals to obtain information bits and non-information bits. The decoder apparatus 230 is also arranged to remove the non-information bits, with the exception of control characters.

The framer 208 is arranged to receive the information bits and an operation and maintenance, O&M, channel carrying service channel bits. The framer comprises FEC apparatus comprising a plurality of interleaved FEC codecs each configured to apply a preselected FEC code, in this example a Reed-Solomon (255, 239) code. The FEC apparatus is configured to apply FEC to the information bits and the newly added service channel bits. The number of interleaved FEC codecs, used to correct bursts of consecutive errors, may be adjusted according to latency requirements. Four interleaved FEC codecs are used here, which reduces the resulting FEC code-word length and latency as compared to FEC apparatus configured according to Annex A of ITU-T Recommendation G.709, which uses 16 interleaved FEC codecs.

The framer is arranged to assemble the parallel streams of information bits and the service channel bits into frames.

The line coding apparatus 234 is arranged to line code the assembled frames using a 64B66B line code, which is more spectrally efficient than the 8B10B line code, to form parallel encapsulated digital communications signals, which are then combined in the parallel to serial converter 236.

Figure 10:
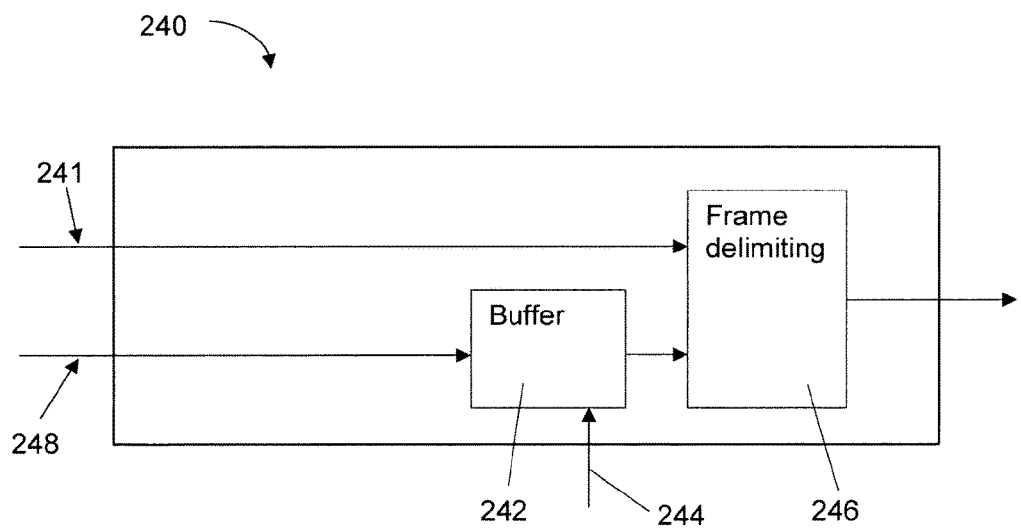
FIG. 10 is a schematic representation of a framer a communications network transmitter according to a twelfth embodiment of the invention.

FIG. 10 shows a framer 240 of a communications network transmitter according to a twelfth embodiment of the invention. The communications network transmitter may be as shown in FIG. 8 or FIG. 9.

The framer 240 of this embodiment comprises a buffer 242 which is arranged to receive a delay asymmetry 244 of the optical link. The buffer is arranged to buffer the information bits 248 for a time offset substantially equal to the delay asymmetry.

The framer 240 also comprises frame delimiting apparatus 246 which is arranged to receive the information bits from the buffer 242 and service channel bits 241, and assemble the information bits and service channel bits into frames.

Figure 11:
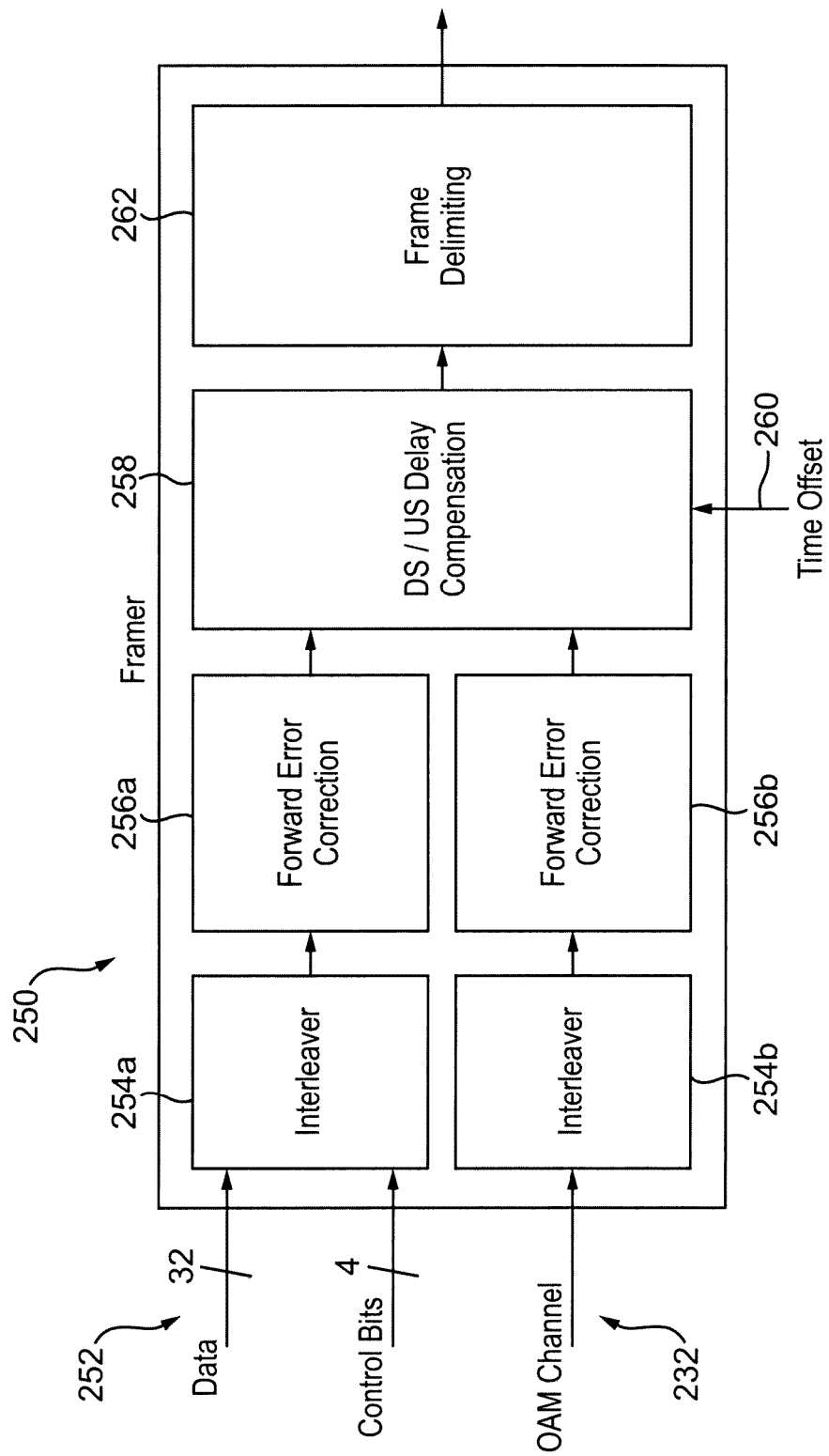
FIG. 11 is a schematic representation of a framer a communications network transmitter according to a thirteenth embodiment of the invention.

FIG. 11 shows a framer 250 of a communications network transmitter according to a thirteenth embodiment of the invention. The communications network transmitter may be as shown in FIG. 9.

The framer 250 comprises interleavers 254a, 254b, FEC apparatus 256a, 256b, a buffer 258 and frame delimiting apparatus 262.

A first one of the interleavers 254a has two inputs, one arranged to receive information bits ('data') 252 and the other arranged to receive control bits, and is arranged to interleave the information bits and control bits. The first FEC apparatus 256a is arranged to apply FEC to the interleaved information and control bits.

The second interleaver 256b is arranged to receive the OAM channel 232 and is arranged to time interleave the service channel bits. The second FEC apparatus 256b is arranged to apply FEC to the interleaved service channel bits.

The buffer 258 which is arranged to receive a time offset 260 substantially equal to the delay asymmetry of the optical link. The buffer is arranged to buffer the FEC wrapped information and control bits for the time offset. The buffer may also be used to buffer the FEC wrapped service channel bits.

The frame delimiting apparatus 262 which is arranged to receive the buffered FEC wrapped information bits and control bits and the FEC wrapped service channel bits 241, and is arranged assemble the FEC wrapped information bits, control bits and service channel bits into frames.

A fourteenth embodiment of the invention provides a communications network transmitter 270 comprising a plurality of inputs 202, 222 clock and data recovery apparatus 204, decoder apparatus 206, 230, framers 208, 240, 250, line coding apparatus 210, 234, and transmitter 212 arranged as a plurality of communications network transmitters 200, 220 as shown in any of FIGS. 8 to 11.

Figure 12:
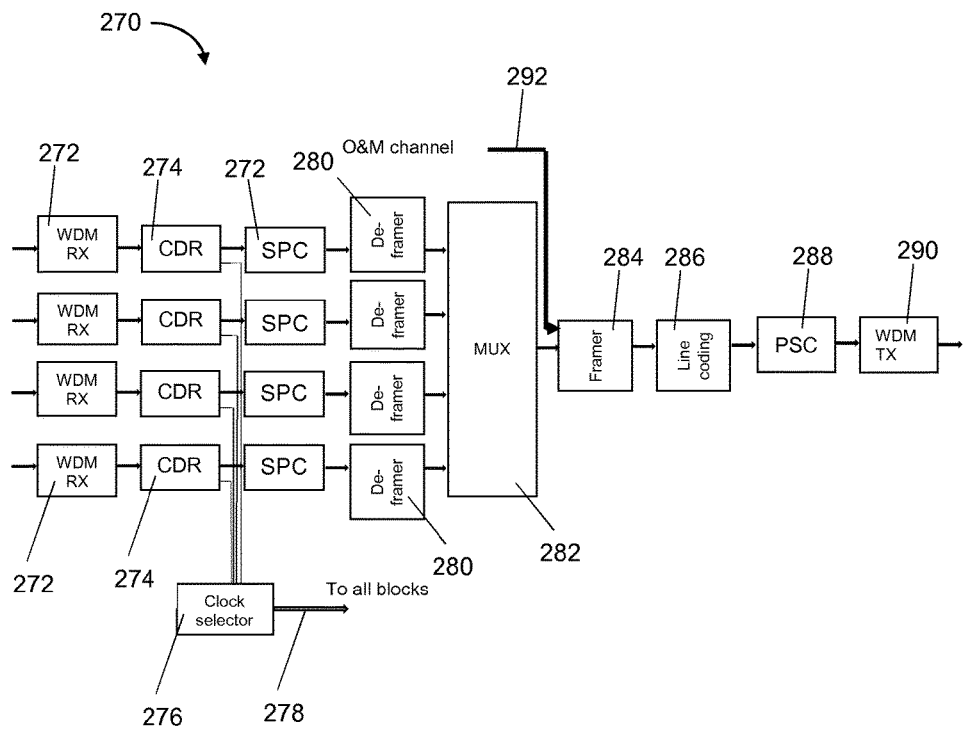
FIG. 12 is a schematic representation of a communications network transmitter according to a fourteenth embodiment of the invention.

As shown in FIG. 12, the communications network transmitter 270 further comprises a plurality of optical receivers, WDM RX, 272, a plurality of further clock and data recovery, CDR, apparatus 274, a plurality of serial to parallel converters, SPC, 272 a clock selector 276, a plurality of deframers 280, a time division multiplexer, MUX, 282, a further framer 284, further line coding apparatus 286, a parallel to serial converter, PSC, 288 and a further optical transmitter, WDM TX, 290.

Each optical receiver 272 is arranged to receive a respective optical signal from a respective one of the transmitters 212, carrying a respective encapsulated digital communications signal.

Each further clock and data recovery apparatus 274 is arranged to perform clock and data recovery on the respective encapsulated digital communications signal to obtain the respective frames and a respective recovered clock signal.

The clock selector 276 is arranged to obtain a clock signal from at least one of the recovered clock signals. In this example the clock selector is arranged to obtain the clock signal by one of arbitrarily selecting one of the recovered clock signals. This is based on the assumption that all of the input digital communications signals are frequency synchronous. Alternatively, the clock selector may be arranged to select a most accurate one of the recovered clock signals or to average the recovered clock signals.

The clock selector 276 is also arranged to generate and transmit a further clock signal 278 comprising the clock signal so obtained. The serial to parallel converters 272, the deframers 280, the multiplexer 282, the further framer 284, the further line coding apparatus 286 and the parallel to serial converter 288 are each arranged to receive the further clock signal and are arranged to operate using the timing of the clock signal obtained by the clock selector.

The deframers 280 are each arranged to disassemble the frames of the respective decoded digital communications signal and to remove the FEC coding to obtain the respective service channel bits and information bits. The deframers are also arranged to remove the respective service channel bits of each said signal.

The time division multiplexer 282 is arranged to time division multiplex the information bits from each of the said signals. The multiplexing is time division based on the assumption that all of the input digital communications signals are frequency synchronous, and no phase synchronisation is required.

The further framer 284 is arranged to add further service channel bits 292 for monitoring or maintenance. The further framer is also arranged to apply forward error correction and to assemble the further service channel bits and time division multiplexed information bits into frames.

The further line coding apparatus 286 is arranged to line code the assembled frames using the output line code to form an encapsulated aggregate digital communications signal for transmission on an optical link.

The further optical transmitter 290 is arranged to generate and transmit a further optical signal carrying the encapsulated aggregate digital communications signal.

The communications network transmitter 270 enables multiplexing of FEC protected tributary signals into one higher bit rate aggregate signal.

Figure 13:
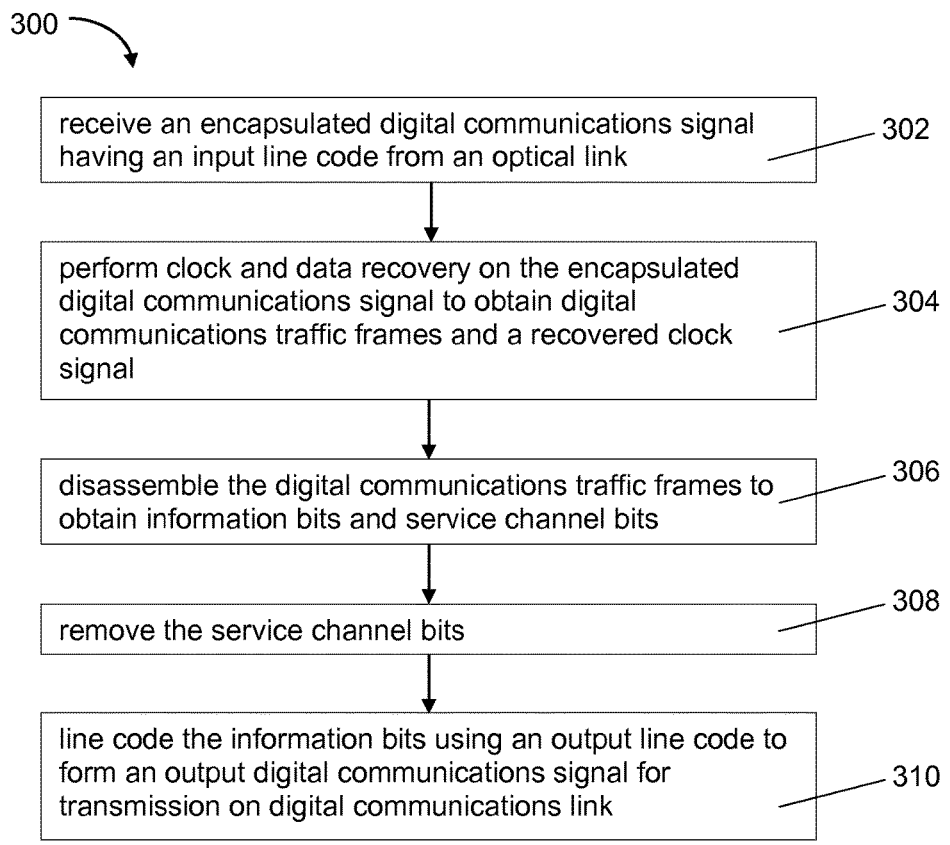
FIG. 13 shows the steps of a method according to a fifteenth embodiment of the invention of converting encapsulated digital communications traffic for transmission on a digital communications link.
Figure 14:
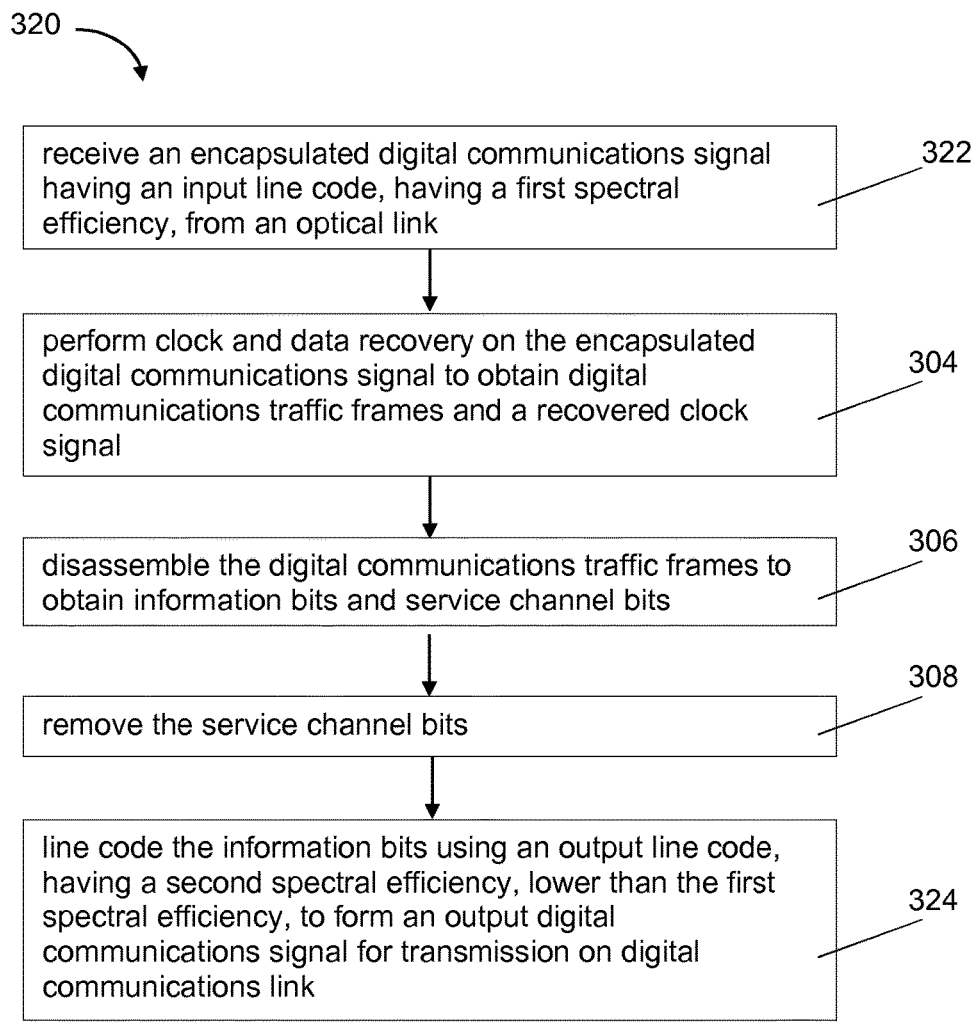
FIG. 14 shows the steps of a method according to a sixteenth embodiment of the invention of converting encapsulated digital communications traffic for transmission on a digital communications link.

Referring to FIG. 13, a fifteenth embodiment of the invention provides a method 300 of converting encapsulated digital communications traffic for transmission on a digital communications link.

The method 300 comprises

A. receiving an encapsulated digital communications signal having an input line code from an optical link 302;

B. performing clock and data recovery on the encapsulated digital communications signal to obtain digital communications traffic frames and a recovered clock signal 304;

C. disassembling the digital communications traffic frames to obtain information bits and service channel bits for monitoring or maintenance 306;

D. removing the service channel bits 308; and

E. line coding the information bits using an output line code to form an output digital communications signal for transmission on digital communications link 310.

Steps C. to E. are performed using the timing of the recovered clock signal.

A sixteenth embodiment of the invention provides a method 320 of converting encapsulated digital communications traffic for transmission on a digital communications link. The method 320 of this embodiment is similar to the method 310 shown in FIG. 13, with the following modifications. The same reference numbers are retained for corresponding steps.

In this embodiment, the input line code has a first spectral efficiency 322 and the output line code has a second spectral efficiency, lower than the first spectral efficiency (324).

Figure 15:
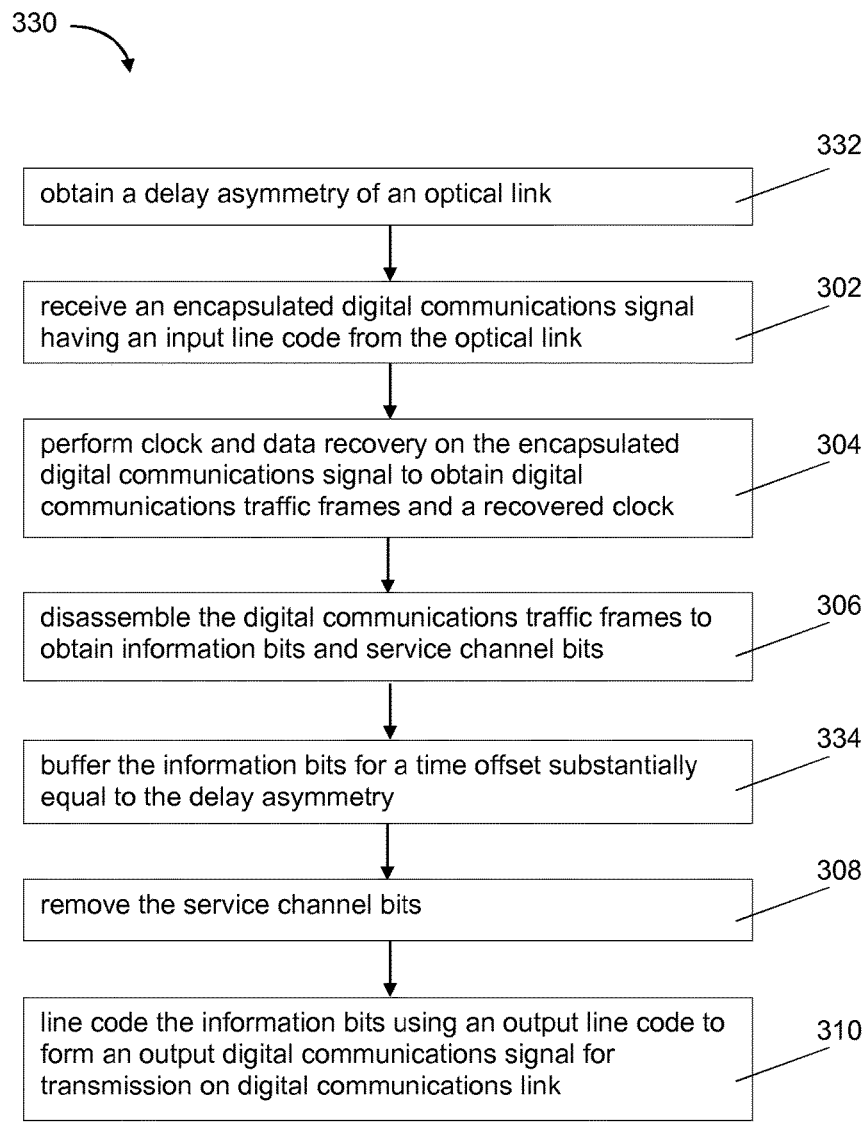
FIG. 15 shows the steps of a method according to a seventeenth embodiment of the invention of converting encapsulated digital communications traffic for transmission on a digital communications link.

A seventeenth embodiment of the invention provides a method 330 of converting encapsulated digital communications traffic for transmission on a digital communications link, having the steps shown in FIG. 15. The method 320 of this embodiment is similar to the method 310 shown in FIG. 13, with the following modifications. The same reference numbers are retained for corresponding steps.

In this embodiment, the method 330 further comprises an initial step of obtaining a delay asymmetry of the optical link 332. Step C. comprises buffering the information bits for a time offset substantially equal to the delay asymmetry 334.

Figure 16:
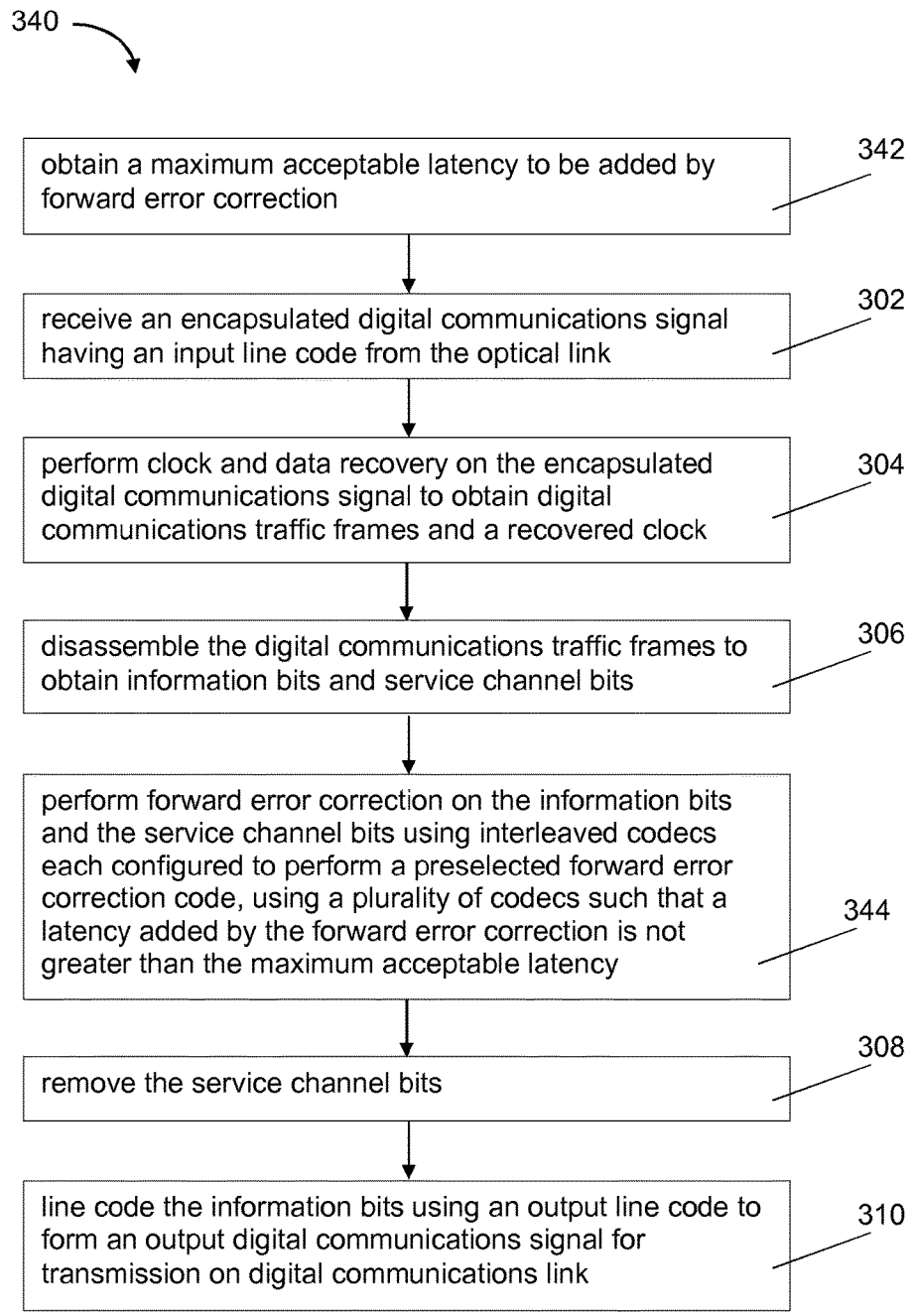
FIG. 16 shows the steps of a method according to an eighteenth embodiment of the invention of converting encapsulated digital communications traffic for transmission on a digital communications link.

FIG. 16 shows the steps of a method 340 according to an eighteenth embodiment of the invention of converting encapsulated digital communications traffic for transmission on a digital communications link. The method 330 of this embodiment is similar to the method 310 shown in FIG. 13, with the following modifications. The same reference numbers are retained for corresponding steps.

In this embodiment, the method comprises obtaining a maximum acceptable latency to be added by forward error correction 342.

Step C. comprises performing forward error correction on the information bits and the service channel bits using a plurality of interleaved FEC codecs each configured to perform a preselected FEC code 344. The forward error correction is performed using a plurality of FEC codecs such that a latency added by performing the forward error correction is not greater than the maximum acceptable latency.

Figure 17:
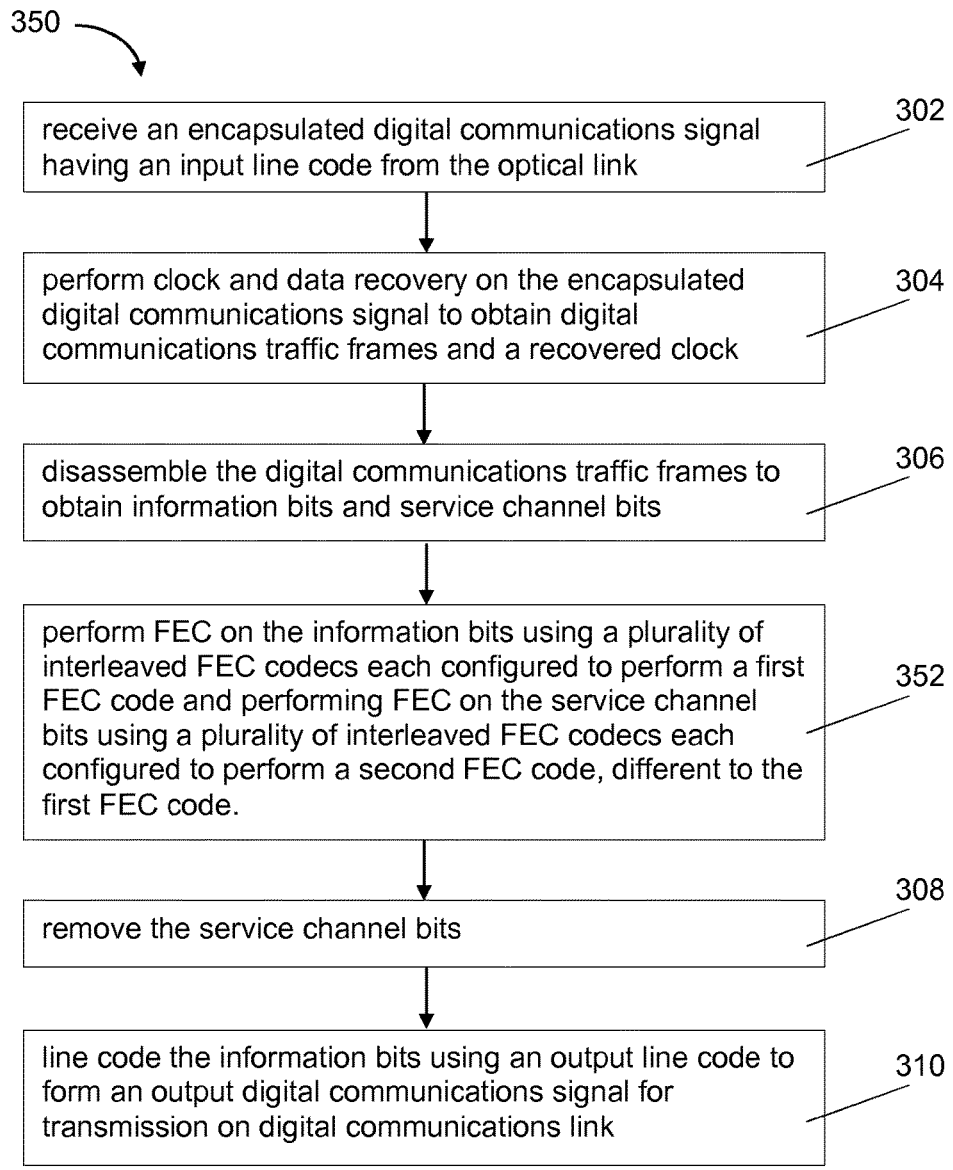
FIG. 17 shows the steps of a method according to a nineteenth embodiment of the invention of converting encapsulated digital communications traffic for transmission on a digital communications link.

FIG. 17 shows the steps of a method 350 according to a nineteenth embodiment of the invention of converting encapsulated digital communications traffic for transmission on a digital communications link. The method 350 of this embodiment is similar to the method 310 shown in FIG. 13, with the following modifications. The same reference numbers are retained for corresponding steps.

In this embodiment, the method comprises performing forward error correction on the information bits using a plurality of interleaved FEC codecs each configured to perform a first FEC code 352. The method further comprises performing forward error correction on the service channel bits using a plurality of interleaved FEC codecs each configured to perform a second FEC code, different to the first FEC code.

Figure 18:
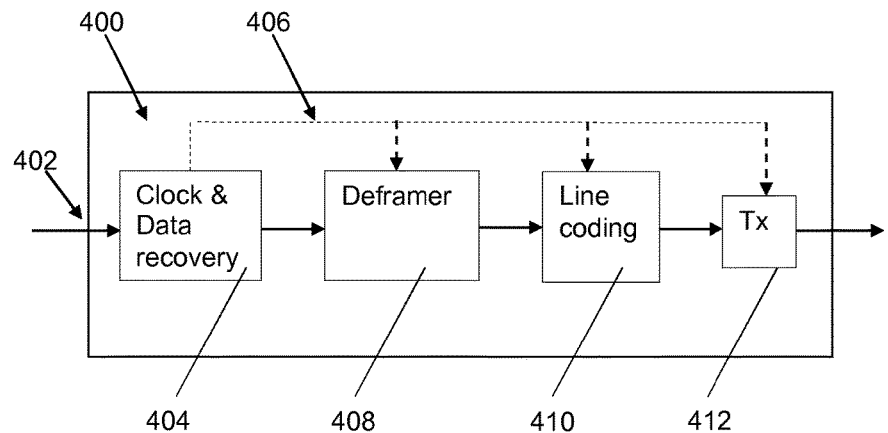
FIG. 18 is a schematic representation of a communications network receiver according to a twentieth embodiment of the invention.

A twentieth embodiment of the invention provides a communications network receiver 400 as shown in FIG. 18. The communications network receiver 400 comprises an input 402, clock and data recovery apparatus 404, a deframer 408, line coding apparatus 410 and a digital transmitter 412.

The input 402 is arranged to receive an optical signal carrying an encapsulated digital communications signal having an input line code.

The clock and data recovery apparatus 404 is arranged to perform clock and data recovery on the encapsulated digital communications signal to obtain digital communications traffic frames and a recovered clock signal. The clock and data recovery apparatus 404 is also arranged to generate and transmit a clock signal 406 comprising the recovered clock signal. The deframer, the line coding apparatus and the digital transmitter are each arranged to receive the clock signal and are each arranged to operate using the timing of the recovered clock signal.

The deframer 408 is arranged to disassemble the digital communications traffic frames to obtain information bits and service channel bits for monitoring or maintenance. The deframer 408 is also arranged to remove the service channel bits.

The line coding apparatus 410 is arranged to line code the information bits using an output line code to form an output digital communications signal for transmission on a digital communications link.

The digital transmitter 412 is arranged to generate and transmit the output digital communications signal.

Figure 19:
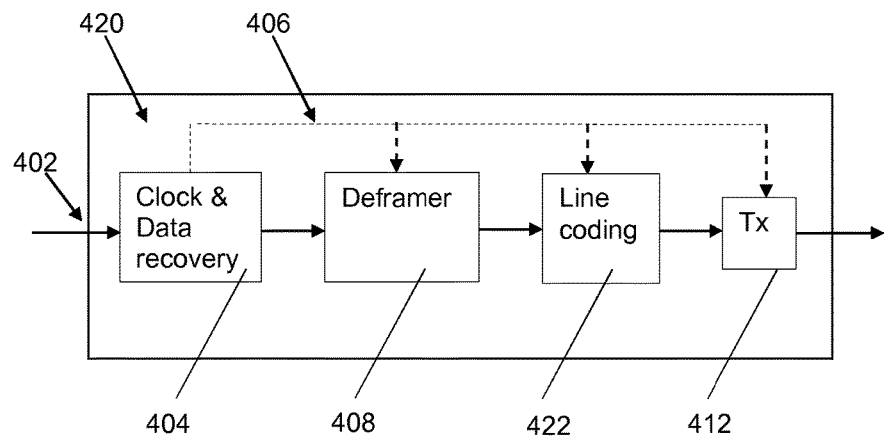
FIG. 19 is a schematic representation of a communications network receiver according to a twenty-first embodiment of the invention.

A twenty-first embodiment of the invention provides a communications network receiver 420 as shown in FIG. 19. The communications network receiver 420 of this embodiment is similar to the communications network receiver 400 shown in FIG. 18, with the following modifications. The same reference numbers are retained for corresponding features.

In this embodiment, the input line code has a first spectral efficiency. The line coding apparatus 422 is arranged to line code the information bits using an output line code having a second spectral efficiency, which is lower than the first spectral efficiency.

Figure 20:
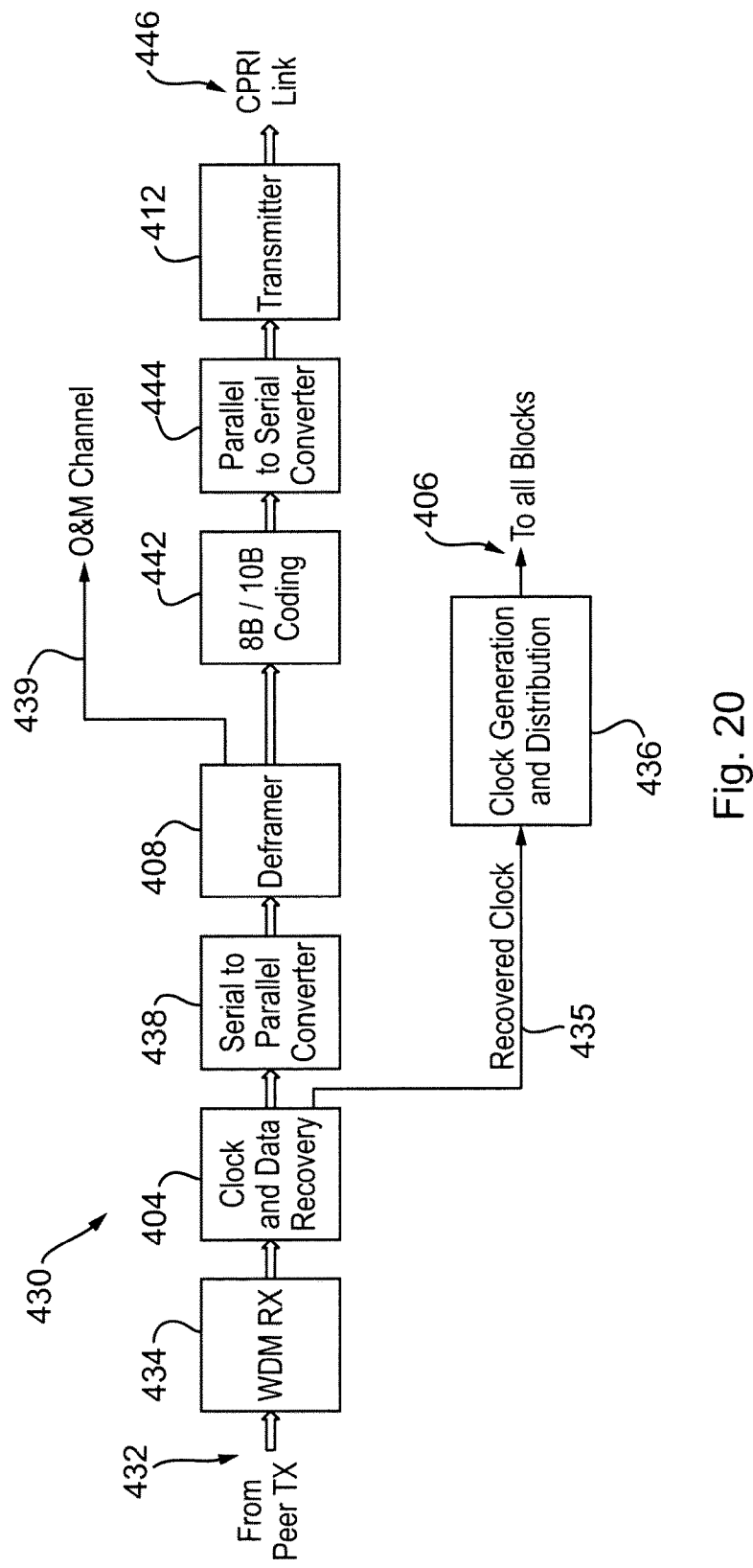
FIG. 20 is a schematic representation of a communications network receiver according to a twenty-second embodiment of the invention.

FIG. 20 shows a communications network receiver 430 according to a twenty-second embodiment of the invention. The communications network receiver 430 of this embodiment is similar to the communications network receiver 400 shown in FIG. 18, with the following modifications. The same reference numbers are retained for corresponding features.

In this embodiment, the communications network receiver 430 additionally comprises an optical receiver, WDM RX, 434, clock signal generation and distribution apparatus 436, a serial to parallel converter 438 and a parallel to serial converter 444.

The receiver 224 is arranged to receive an optical signal carrying an encapsulated digital communications signal having an input line code and output the encapsulated digital communications signal it to the clock and data recovery apparatus 404. In this example, the input line code is a 64B66B line code.

The recovered clock signal 435 is sent to the clock signal generation and distribution apparatus 436, which is arranged to generate and transmit the clock signal 406 to the serial to parallel converter 438, deframer 408, line coding apparatus 442, parallel to serial converter 444 and the digital transmitter 412.

The serial to parallel converter 438 converts the encapsulated digital communications signal into a plurality of parallel signals for parallel processing by the deframer 408 and the line coding apparatus 442. The parallel to serial converter 444 receives a plurality of line coded digital communication signals and converts them into a single digital communications signal for transmission by the transmitter 412. It will be appreciated that the serial to parallel converter 438 and the parallel to serial converter 444 are not essential but their use may increase the overall processing speed achievable by the deframer and the line coding apparatus.

The line coding apparatus 442 is arranged to line code the information bits using an 8B10B line code, which is less spectrally efficient than the received 64B66B line code, to form parallel line coded digital communications signals, which are then combined in the parallel to serial converter 444.

Figure 21:
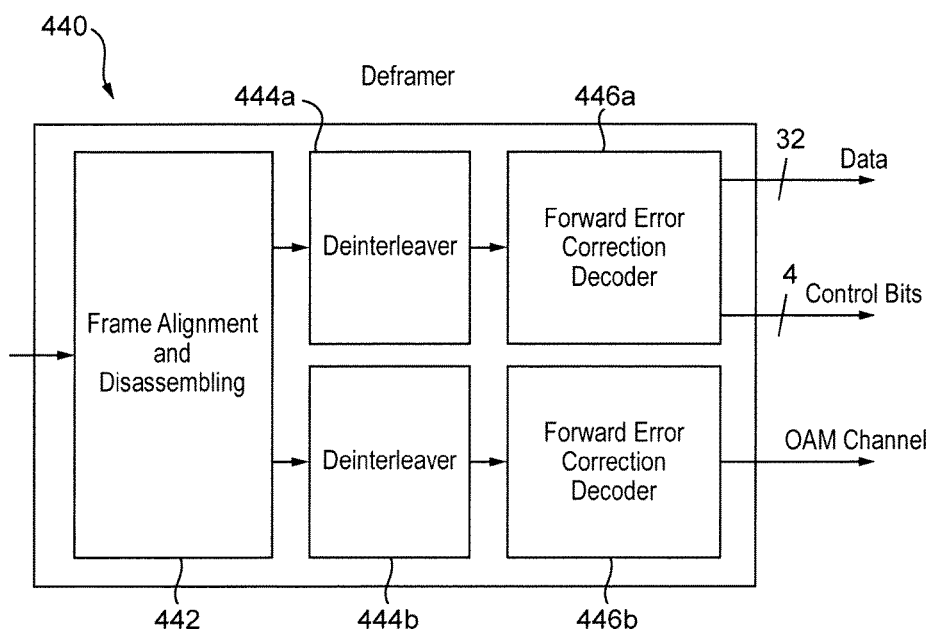
FIG. 21 is a schematic representation of a deframer of communications network receiver according to a twenty-third embodiment of the invention.

FIG. 21 shows a deframer 440 of a communications network receiver according to a twenty-third embodiment of the invention. The communications network receiver of this embodiment has the same structure as shown in FIG. 20.

The deframer 440 comprises frame alignment and disassembling apparatus 442, deinterleavers 444a, 444b, and forward error correction apparatus comprising first and second forward error correction decoders 446a, 446b.

The frame alignment and disassembling apparatus 442 is arranged to receive the encapsulated digital communications signal and is arranged to recover frame alignment and disassemble the frames to obtain interleaved FEC wrapped information bits, control bits and service channel bits. The first of the deinterleavers 444a is arranged to receive the interleaved FEC wrapped information bits and control bits and is arranged to deinterleave the FEC wrapped information bits and control bits. The second deinterleaver 444b receives the interleaved FEC wrapped service channel bits and is arranged to deinterleave the FEC wrapped service channel bits.

The first of the forward error correction decoders 446a is arranged to receive the FEC wrapped information bits and control bits and is arranged to perform forward error correction on them using a preselected FEC code. The second forward error correction decoder 446b is arranged to receive the FEC wrapped service channel bits and is arranged to perform forward error correction on them using a preselected FEC code. In this example each FEC codes is a Reed-Solomon (255, 239) code.

Figure 22:
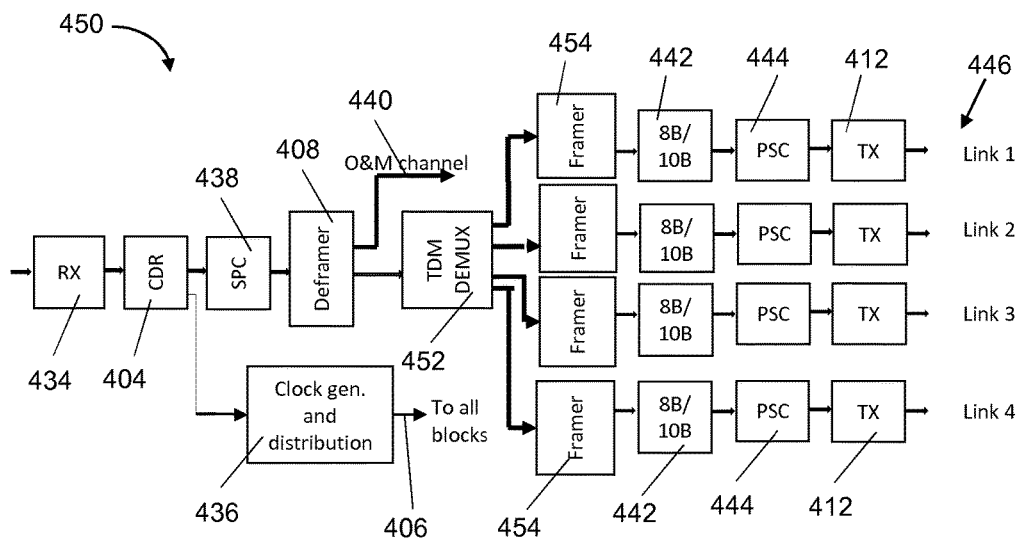
FIG. 22 is a schematic representation of a communications network receiver according to a twenty-fourth embodiment of the invention.

Referring to FIG. 22, a twenty-fourth embodiment of the invention provides a communications network receiver 450 as shown in FIG. 22 The communications network receiver 450 of this embodiment is similar to the communications network receiver 430 shown in FIG. 20 or the communications network receiver of the previous embodiment having the deframer 440 shown in FIG. 21, with the following modifications.

The communications network receiver 450 additionally comprises a time division demultiplexer, TDM DEMUX, 452, four framers 454, three further line coding apparatus 442, three further parallel to serial converters 444 and three further digital transmitters 412.

The time division demultiplexer 452 is arranged to receive the information bits from the deframer 408 and is arranged to time division demultiplex the information bits into a plurality of streams of information bits.

The framers 454 are each arranged to perform forward error correction on the respective streams of information bits.

Each of the line coding apparatus 442 is arranged to receive a respective one of the streams of information bits. Each of the line coding apparatus is arranged to line code the respective information bits using an output line code.

Each digital transmitter 412 is arranged to receive the respective line coded information bits and is arranged to generate and transmit a respective output digital communications signal.

The time division demultiplexer, each framer, each line coding apparatus and each digital transmitter is arranged to receive the clock signal and is arranged to operate using the timing of the recovered clock signal.

Figure 23:
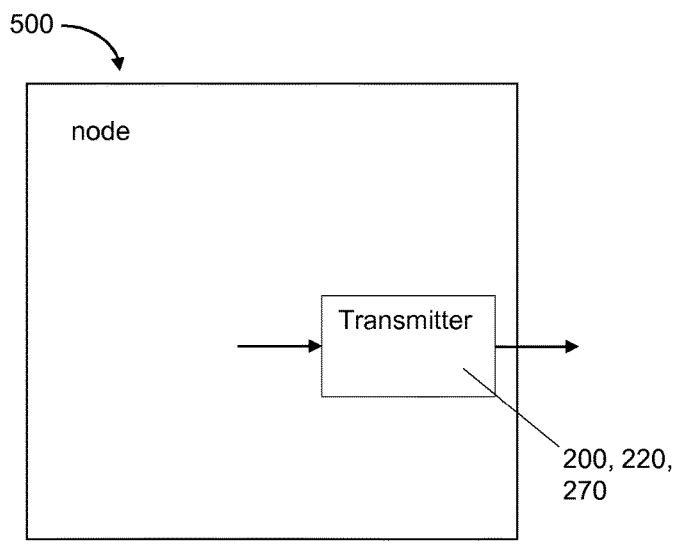
FIG. 23 is a schematic representation of a communications network radio base station node according to a twenty-fifth embodiment of the invention.

Referring to FIG. 23, a twenty-fifth embodiment of the invention provides a communications network base station node 500 comprising a communications network transmitter 200, 220, 270 as described above with reference to any of FIGS. 8 to 12.

Figure 24:
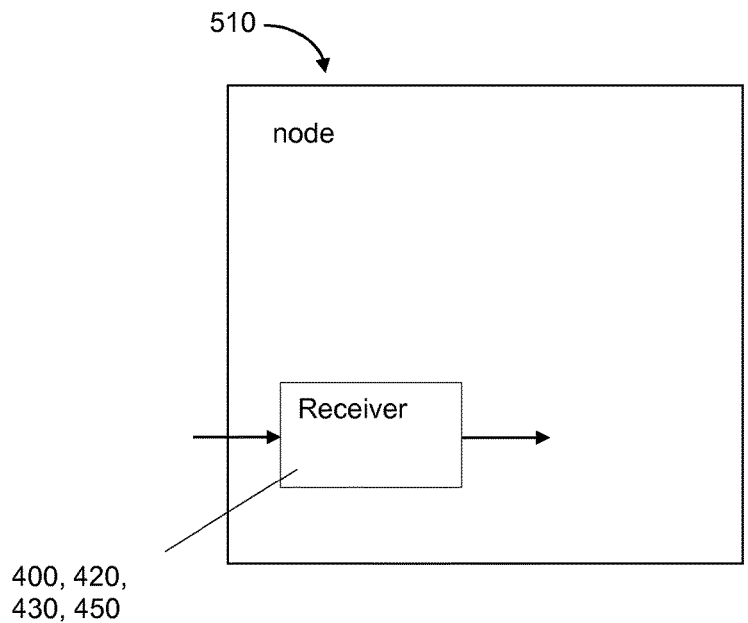
FIG. 24 is a schematic representation of a communications network radio base station node according to a twenty-sixth embodiment of the invention.

Referring to FIG. 24, a twenty-sixth embodiment of the invention provides a communications network base station node 510 comprising a communications network receiver 400, 420, 430, 450 as described above with reference to any of FIGS. 18 to 22.

Figure 25:
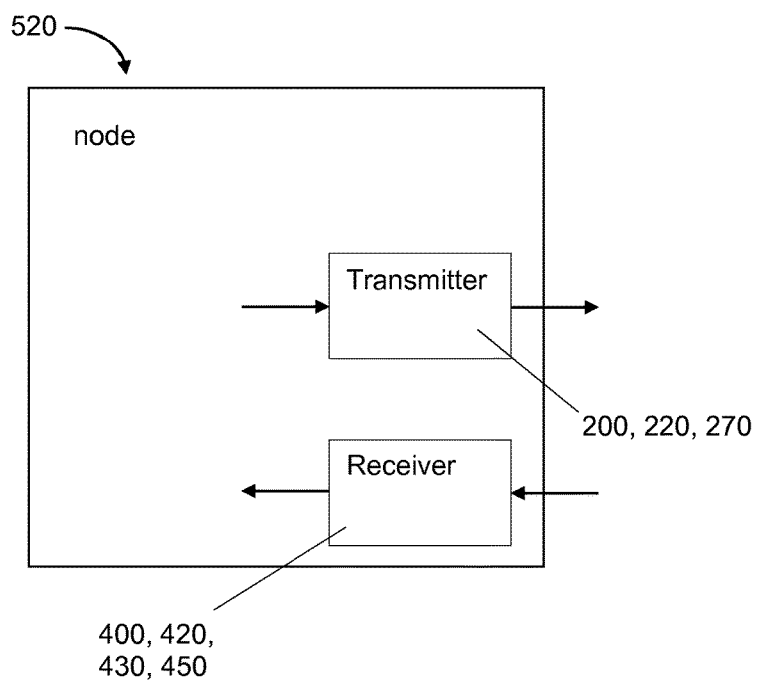
FIG. 25 is a schematic representation of a communications network radio base station node according to a twenty-seventh embodiment of the invention.

Referring to FIG. 25, a twenty-seventh embodiment of the invention provides a communications network base station node 520 comprising a communications network transmitter 200, 220, 270 as described above with reference to any of FIGS. 8 to 12 and a communications network receiver 400, 420, 430, 450 as described above with reference to any of FIGS. 18 to 22.

Figure 26:
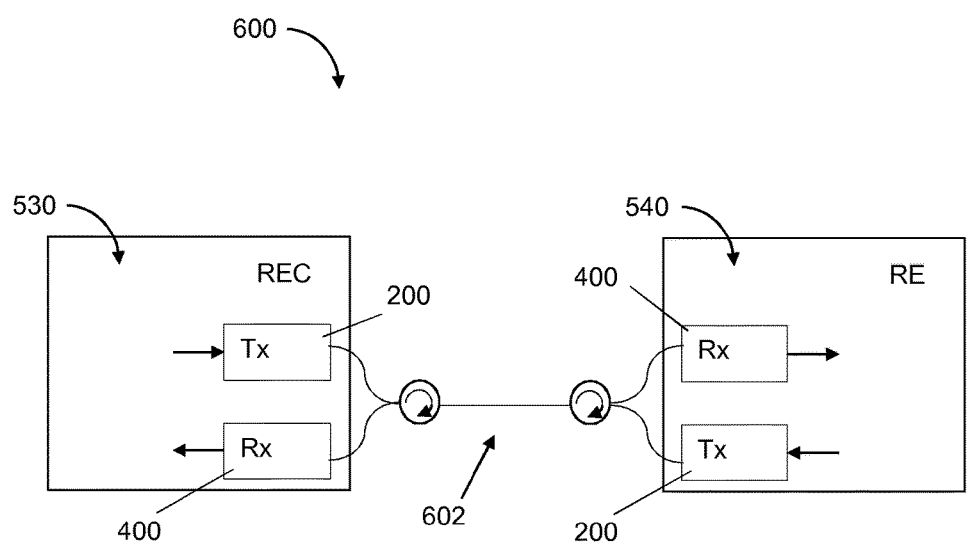
FIG. 26 is a schematic representation of a communications network radio base station according to a twenty-eighth embodiment of the invention.

Referring to FIG. 26, a twenty-eighth embodiment of the invention provides a network base station 600 comprising at least two communications network base station nodes 500, 510, 520 as described above with reference to any of FIGS. 23 to 25 and at least one optical link connecting the two nodes.

A twenty-ninth embodiment of the invention provides a data carrier having computer readable instructions embodied therein. The computer readable instructions are for providing access to resources available on a processor. The computer readable instructions comprise instructions to cause the processor to perform any of the steps of the method 10, 30, 40, 50, 60, 100, 110 of encapsulating digital communications traffic for transmission on an optical link as described above with reference to FIGS. 1 to 7.

The data carrier may be a non-transitory data carrier.

A thirtieth embodiment of the invention provides a data carrier having computer readable instructions embodied therein. The said computer readable instructions are for providing access to resources available on a processor. The computer readable instructions comprise instructions to cause the processor to perform any of the above steps of the method 300, 320, 33, 340, 350 of converting encapsulated digital communications traffic for transmission on a digital communications link as described above with reference to FIGS. 31 to 17.

The data carrier may be a non-transitory data carrier.

The invention claimed is:

1. A method of encapsulating digital communications traffic for transmission on an optical link, the method comprising:
   a. receiving an input digital communications signal having an input line code;
   b. performing clock and data recovery on the input digital communications signal to obtain input line coded digital communications traffic and a recovered clock signal;
   c. decoding the input line coded digital communications traffic to obtain information bits and non-information bits;
   d. removing the non-information bits;
   e. adding service channel bits for monitoring or maintenance;
   f. assembling the service channel bits and information bits into frames; and
   g. line coding the assembled frames using an output line code to form an encapsulated digital communications signal for transmission on an optical link,
   wherein steps c. to g. are performed using a timing of the recovered clock signal.

2. The method as claimed in claim 1, wherein the input line code has a first spectral efficiency and the output line code has a second spectral efficiency, higher than the first spectral efficiency.

3. The method as claimed in claim 1, and further comprising obtaining a delay asymmetry of the optical link and step f. comprises buffering the information bits for a time offset substantially equal to the delay asymmetry.

4. The method as claimed in claim 1, wherein step f. comprises applying forward error correction to the information bits and to the service channel bits using a plurality of interleaved forward error correction codecs each configured to apply a preselected forward error correction code, and wherein the method comprises obtaining a maximum acceptable latency to be added by the forward error correction and selecting said plurality of forward error correction codecs such that a latency added by the forward error correction is not greater than the maximum acceptable latency.

5. The method as claimed in claim 1, wherein step f. comprises applying forward error correction to the information bits using a plurality of interleaved forward error correction codecs each configured to apply a first forward error correction code and step f. comprises applying forward error correction to the service channel bits using a plurality of interleaved forward error correction codecs each configured to apply a second forward error correction code, different to the first forward error correction code.

6. The method as claimed in claim 1 and comprising at step a. receiving a plurality of input digital communications signals each having the input line code, performing steps b. to g. for each input digital communication signal to form a respective encapsulated digital communications signal and generating and transmitting a respective optical signal carrying each encapsulated digital communications signal, and the method further comprising:
   i. receiving each said optical signal;
   ii. performing clock and data recovery on each respective encapsulated digital communications signal to obtain the respective frames and a respective recovered clock signal;
   iii. obtaining a clock signal from at least one of the recovered clock signals;
   iv. disassembling the frames of each said signal and removing the forward error correction coding to obtain the respective service channel bits and information bits, and removing the respective service channel bits of each said signal;
   v. time division multiplexing the information bits from each of the said signals;
   vi. adding further service channel bits for monitoring or maintenance;
   vii. applying forward error correction to the further service channel bits and time division multiplexed information bits and assembling the further service channel bits and time division multiplexed information bits into frames; and
   viii. line coding the assembled frames using the output line code to form an encapsulated aggregate digital communications signal for transmission on an optical link,
   wherein steps v. to viii. are performed using the timing of the clock signal obtained in step iii.

7. A communications network transmitter comprising:
   an input arranged to receive an input digital communications signal having an input line code;
   clock and data recovery apparatus arranged to perform clock and data recovery on the input digital communications signal to obtain input line coded digital communications traffic and a recovered clock signal, and arranged to generate and transmit a clock signal comprising the recovered clock signal;
   decoder apparatus arranged to decode the input line coded digital communications traffic to obtain information bits and non-information bits and arranged to remove the non-information bits;
   a framer arranged to receive the information bits and service channel bits for monitoring or maintenance, and arranged to assemble the service channel bits and information bits into frames;
   line coding apparatus arranged to line code the assembled frames using an output line code to form an encapsulated digital communications signal for transmission on an optical link; and an optical transmitter arranged to generate and transmit an optical signal carrying the encapsulated digital communications signal, wherein each of the decoder apparatus, the framer and the line coding apparatus are arranged to receive the clock signal and are arranged to operate using a timing of the recovered clock signal.

8. The communications network transmitter as claimed in claim 7, wherein the input line code has a first spectral efficiency and the line coding apparatus is arranged to line code the assembled frames using an output line code having a second spectral efficiency, higher than the first spectral efficiency.

9. The communications network transmitter as claimed in claim 7, wherein the framer is arranged to obtain a delay asymmetry of the optical link and the framer comprises a buffer arranged to buffer the information bits for a time offset substantially equal to the delay asymmetry.

10. The communications network transmitter as claimed in claim 7, wherein the framer comprises forward error correction apparatus comprising a plurality of forward error correction codecs each configured to apply a preselected forward error correction code, and wherein the forward error correction codecs are interleaved and said plurality of interleaved forward error correction codecs is such that a latency added by the forward error correction is not greater than a maximum acceptable latency.

11. The communications network transmitter as claimed in claim 7, wherein the forward error correction apparatus comprises a plurality of interleaved forward error correction codecs each configured to apply a first forward error correction code to the information bits and the forward error correction apparatus comprises a plurality of interleaved forward error correction codecs each configured to apply a second forward error correction code, different to the first forward error correction code, to the service channel bits.

12. The communications network transmitter as claimed in claim 7, further comprising:
at least one further input, clock and data recovery apparatus, decoder apparatus, framer and line coding apparatus;
a plurality of optical receivers each arranged to receive a respective optical signal from a respective one of the transmitters carrying a respective encapsulated digital communications signal;
a plurality of further clock and data recovery apparatus each arranged to perform clock and data recovery on the respective encapsulated digital communications signal to obtain the respective frames and a respective recovered clock signal;
a clock selector arranged to obtain a clock signal from at least one of the recovered clock signals and to generate and transmit a further clock signal comprising said obtained clock signal;
a plurality of deframers each arranged to disassemble the frames of the respective decoded digital communications signal and remove the forward error correction coding to obtain the respective service channel bits and information bits, and arrange to remove the respective service channel bits of each said signal;
a time division multiplexer arranged to time division multiplex the information bits from each of the said signals;
a further framer arranged to add further service channel bits for monitoring or maintenance, apply forward error correction and assemble the further service channel bits and time division multiplexed information bits into frames;
further line coding apparatus arranged to line code the assembled frames using the output line code to form an encapsulated aggregate digital communications signal for transmission on an optical link, and
a further optical transmitter arranged to generate and transmit a further optical signal carrying the encapsulated aggregate digital communications signal,
wherein each of the deframers, the multiplexer, the further framer and the further line coding apparatus are arranged to receive the further clock signal and are arranged to operate using the timing of said obtained clock signal.

13. The communications network transmitter as claimed in claim 12, wherein the clock selector is arranged to obtain the clock signal by one of arbitrarily selecting one of the recovered clock signals, selecting a most accurate one of the recovered clock signals and averaging the recovered clock signals.

14. A communications network base station node comprising at least one of the communications network transmitter as claimed in claim 7 and a communications network receiver.

15. A communications network base station comprising:
at least two communications network base station nodes as claimed in claim 14; and at least one optical link connecting said at least two communications network base station nodes.

16. A method of converting encapsulated digital communications traffic for transmission
on a digital communications link, the method comprising:
A. receiving an encapsulated digital communications signal having an input line code from an optical link;
B. performing clock and data recovery on the encapsulated digital communications signal to obtain digital communications traffic frames and a recovered clock signal;
C. disassembling the digital communications traffic frames to obtain information bits and service channel bits for monitoring or maintenance;
D. removing the service channel bits; and
E. line coding the information bits using an output line code to form an output digital communications signal for transmission on digital communications link,
wherein steps C. to E. are performed using a timing of the recovered clock signal.

17. The method as claimed in claim 16, wherein the input line code has a first spectral efficiency and the output line code has a second spectral efficiency, lower than the first spectral efficiency.

18. The method as claimed in claim 16, and further comprising obtaining a delay
asymmetry of the optical link and step C. comprises buffering the information bits for a time offset substantially equal to the delay asymmetry.

19. The method as claimed in claim 16, wherein step C. comprises performing forward error correction on the information bits and the service channel bits using a plurality of interleaved forward error correction codecs each configured to perform a preselected forward error correction code, and wherein the method comprises obtaining a maximum acceptable latency to be added by the forward error correction and using a plurality of forward error correction codecs such that a latency added by the forward error correction is not greater than the maximum acceptable latency.

20. The method as claimed in claim 16, wherein step C. comprises performing forward error correction on the information bits using a plurality of interleaved forward error correction codecs each configured to perform a first forward error correction code and performing forward error correction on the service channel bits using a plurality of interleaved forward error correction codecs each configured to perform a second forward error correction code, different to the first forward error correction code.

21. A communications network receiver comprising:
- an input arranged to receive an optical signal carrying an encapsulated digital communications signal having an input line code;
- clock and data recovery apparatus arranged to perform clock and data recovery on the encapsulated digital communications signal to obtain digital communications traffic frames and a recovered clock signal, and arranged to generate and transmit a clock signal comprising the recovered clock signal;
- a deframer arranged to disassemble the digital communications traffic frames to obtain information bits and service channel bits for monitoring or maintenance, and arranged to remove the service channel bits;
- line coding apparatus arranged to fine code the information bits using an output line code to form an output digital communications signal for transmission on a digital communications link; and
- a digital transmitter arranged to generate and transmit the output digital communications signal,
- wherein the deframer, the line coding apparatus and the digital transmitter are each arranged to receive the clock signal and are each arranged to operate using a timing of the recovered clock signal.

22. The communications network receiver as claimed in claim 21, wherein the input line code has a first spectral efficiency and the line coding apparatus is arranged to line code the information bits using an output line code having a second spectral efficiency, lower than the first spectral efficiency.

23. The communications network receiver as claimed in claim 21, further comprising:
- a time division demultiplexer arranged to receive the information bits from the deframer and arranged to time division demultiplex the information bits into a plurality of streams of information bits;
- at least one further said line coding apparatus, each said line coding apparatus arranged to receive a respective one of the streams of information bits and arranged to line code the information bits using an output line code to form a respective output digital communications signal for transmission on a respective digital communications link; and
- at least one further said digital transmitter, each digital transmitter arranged to generate and transmit the respective output digital communications signal,
- wherein the time division demultiplexer, each line coding apparatus and each digital transmitter is arranged to receive the clock signal and is arranged to operate using the timing of the recovered clock signal.

* * * * *